(12) United States Patent
Flannery

(10) Patent No.: US 10,079,558 B2
(45) Date of Patent: Sep. 18, 2018

(54) SWITCHING SCHEME FOR STATIC SYNCHRONOUS COMPENSATORS USING CASCADED H-BRIDGE CONVERTERS

(71) Applicant: American Superconductor Corporation, Ayer, MA (US)

(72) Inventor: Patrick S. Flannery, Madison, WI (US)

(73) Assignee: American Superconductor Corporation, Ayer, MA (US)

( * ) Notice: Subject to any disclaimer, the term of this patent is extended or adjusted under 35 U.S.C. 154(b) by 0 days.

(21) Appl. No.: 15/093,842

(22) Filed: Apr. 8, 2016

(65) Prior Publication Data

US 2017/0294853 A1  Oct. 12, 2017

(51) Int. Cl.
H02M 1/42  (2007.01)
H02M 7/537  (2006.01)
H02M 7/483  (2007.01)
H02J 3/18  (2006.01)

(52) U.S. Cl.
CPC .......... H02M 7/483 (2013.01); H02J 3/1857 (2013.01); *H02M 2007/4835* (2013.01)

(58) Field of Classification Search
CPC .............................. H02M 1/42; H02M 7/537
USPC ......................................................... 363/131
See application file for complete search history.

(56) References Cited

U.S. PATENT DOCUMENTS

| | | | | |
|---|---|---|---|---|
| 5,642,275 A | * | 6/1997 | Peng | H02M 7/49 363/137 |
| 6,005,788 A | * | 12/1999 | Lipo | H02M 7/49 363/71 |
| RE37,126 E | | 4/2001 | Peng et al. | |
| 7,230,837 B1 | | 6/2007 | Huang et al. | |
| 8,169,107 B2 | | 5/2012 | Hammond et al. | |

(Continued)

FOREIGN PATENT DOCUMENTS

EP  2926448 A1  10/2015

OTHER PUBLICATIONS

Iman-Eini et al. "A Modular Strategy for Control and Voltage Balancing of Cascaded H-Bridge Rectifiers" IEEE Transactions on Power Electronics, Institute of Electrical and Electronics Engineers, 23(5):2428-2442, 2008.

(Continued)

*Primary Examiner* — Adolf Berhane
*Assistant Examiner* — Bart Iliya
(74) *Attorney, Agent, or Firm* — Verrill Dana, LLP; John W. Powell

(57) ABSTRACT

A static synchronous compensator includes at least one converter pole for producing a first phase of an AC voltage waveform having a fundamental cycle. The first phase of the AC voltage waveform includes alternating converter pole charging and discharging regions in each fundamental cycle. The at least one converter pole includes a plurality of cascaded H-bridge cells, each having a DC voltage source and a plurality of switches. The switches are capable of being switched to produce a plurality of switching states. There is a controller configured to control the switching states of the plurality of switches of each of the cascaded H-bridge cells based on the voltages of DC voltage sources of the H-bridge cells and on whether the AC waveform is in the converter pole charging region or the converter pole discharging region.

17 Claims, 18 Drawing Sheets

(56) References Cited

U.S. PATENT DOCUMENTS

| | | | |
|---|---|---|---|
| 8,619,446 B2 | 12/2013 | Liu et al. | |
| 8,848,407 B2 | 9/2014 | Blomberg | |
| 8,860,380 B2 | 10/2014 | Hasler | |
| 8,982,593 B2 | 3/2015 | Nondahl et al. | |
| 2008/0144342 A1* | 6/2008 | Du | H02M 7/49 363/71 |
| 2009/0251938 A1* | 10/2009 | Hallak | H02M 7/4807 363/132 |
| 2011/0198936 A1* | 8/2011 | Graovac | H02M 7/79 307/82 |
| 2012/0063181 A1* | 3/2012 | Chimento | H02M 1/32 363/56.03 |
| 2013/0169257 A1 | 7/2013 | Baek et al. | |
| 2015/0028831 A1* | 1/2015 | Glinka | H02M 5/225 323/271 |

OTHER PUBLICATIONS

Karamanakos et al. "An Enumeration-Based Model Predictive Control Strategy for the Cascaded H-Bridge Multilevel Rectifier," IEEE Transactions on Industrial Electronics, 61(7):3480-3489, 2014.

Liu et al. "An Optimal Combination Modulation Strategy for a Seven-level Cascade Multilevel Converter Based STATCOM," IEEE Semiconductor Power Electronics Center, North Carolina State University, Raleigh NC; 1(4244-0365):1732-1737, 2006.

Townsend et al. "Optimization of Switching Losses and Capacitor Voltage Ripple Using Model Predictive Control of a Cascaded H-Bridge Multilevel StatCom," IEEE Transactions on Power Electronics, 28(7):3077-3087, 2013.

Siriroj Sirisukprasert: "Chapter Control of Cascaded-Multilevel Converter-Based Statcom", Feb. 13, 2004 (Feb. 13, 2004), pp. 109-210, XP055101328, Retrieved from the Internet: URL:http://scholar.lib.vt.edu/theses/available/etd-04212004-152319/unrestricted/siri rojchapter5.pdf [retrieved on Feb. 11, 2014] p. 169-197: "III. DC Capacitor Voltage Balance Control Approaches".

Behrouzian Ehsan et al: "Individual capacitor voltage balancing in H-bridge cascaded multilevel STATCOM at zero current operating mode", 2015 17th European Conference on Power Electronics and Applications (EPE '15 ECCE-Europe), Jointly Owned by EPE Association and IEEE PELS, Sep. 8, 2015 (Sep. 8, 2015), pp. 1-10, XP032800223, DOI: 10.1109/EPE.2015.7309220 [retrieved on Oct. 27, 2015] the whole document.

Schnarrenberger Mathias et al: "Cell design of a square-wave powered 1AC-3AC modular multilevel converter low voltage prototype", 2016 18th European Conference on Power Electronics and Applications (EPE '16 ECCE Europe), Jointly Owned by IEEE-PELS and EPE Association, Sep. 5, 2016 (Sep. 5, 2016), pp. 1-11, XP032985090, DOI: 10.1109/EPE.2016.7695373 [retrieved on Oct. 25, 2016] p. 8: "Switching Losses".

International Search Report and Written Opinion, dated Mar. 23, 2018 received in international patent application No. PCT/US2017/044168, 15 pgs.

* cited by examiner

| State # 1 | State # 2 | State # 3 | State # 4 |
|---|---|---|---|
| 20 | 20 | 20 | 20 |
| $V_H = +V_{dc}$ | $V_H = -V_{dc}$ | $V_H = 0$ | $V_H = 0$ |
| $I_C = -I_p$ (discharges cell cap, $V_{dc}\downarrow$) | $I_C = +I_p$ (discharges cell cap, $V_{dc}\uparrow$) | $I_C = 0$ (no change to cell cap, $V_{dc}$ = const) | $I_C = 0$ (no change to cell cap, $V_{dc}$ = const) |
| Status: "Active" | Status: "Active" | Status: "Passive" | Status: "Passive" |
| Switch Function: +1 | Switch Function: -1 | Switch Function: 0 | Switch Function: 0 |

FIG. 3

| 190b without PWM | 192b without PWM |
|---|---|
| 1) Calculate Error = \|\|Vpcmd\| - Sum(Vdc, active)\|<br>2) Select the passive cell with lowest cell Vdc, and check if Error > 0.5 x Vdc<br>3) If 2) is true, activate the passive cell.<br>4) Repeat 1) through 3) until 2) is false. | 1) Calculate Error = \|\|Vpcmd\| - Sum(Vdc, active)\|<br>2) Select the passive cell with highest cell Vdc, and check if Error > 0.5 x Vdc<br>3) If 2) is true, activate the passive cell.<br>4) Repeat 1) through 3) until 2) is false. |
| 190c without PWM | 192c without PWM |
| 1) Calculate Error = \|\|Vpcmd\| - Sum(Vdc, active)\|<br>2) Select the active cell with highest cell Vdc, and check if Error > 0.5 x Vdc<br>3) If 2) is true, deactivate the active cell.<br>4) Repeat 1) through 3) until 2) is false. | 1) Calculate Error = \|\|Vpcmd\| - Sum(Vdc, active)\|<br>2) Select the active cell with lowest cell Vdc, and check if Error > 0.5 x Vdc<br>3) If 2) is true, deactivate the active cell.<br>4) Repeat 1) through 3) until 2) is false. |

FIG. 8B

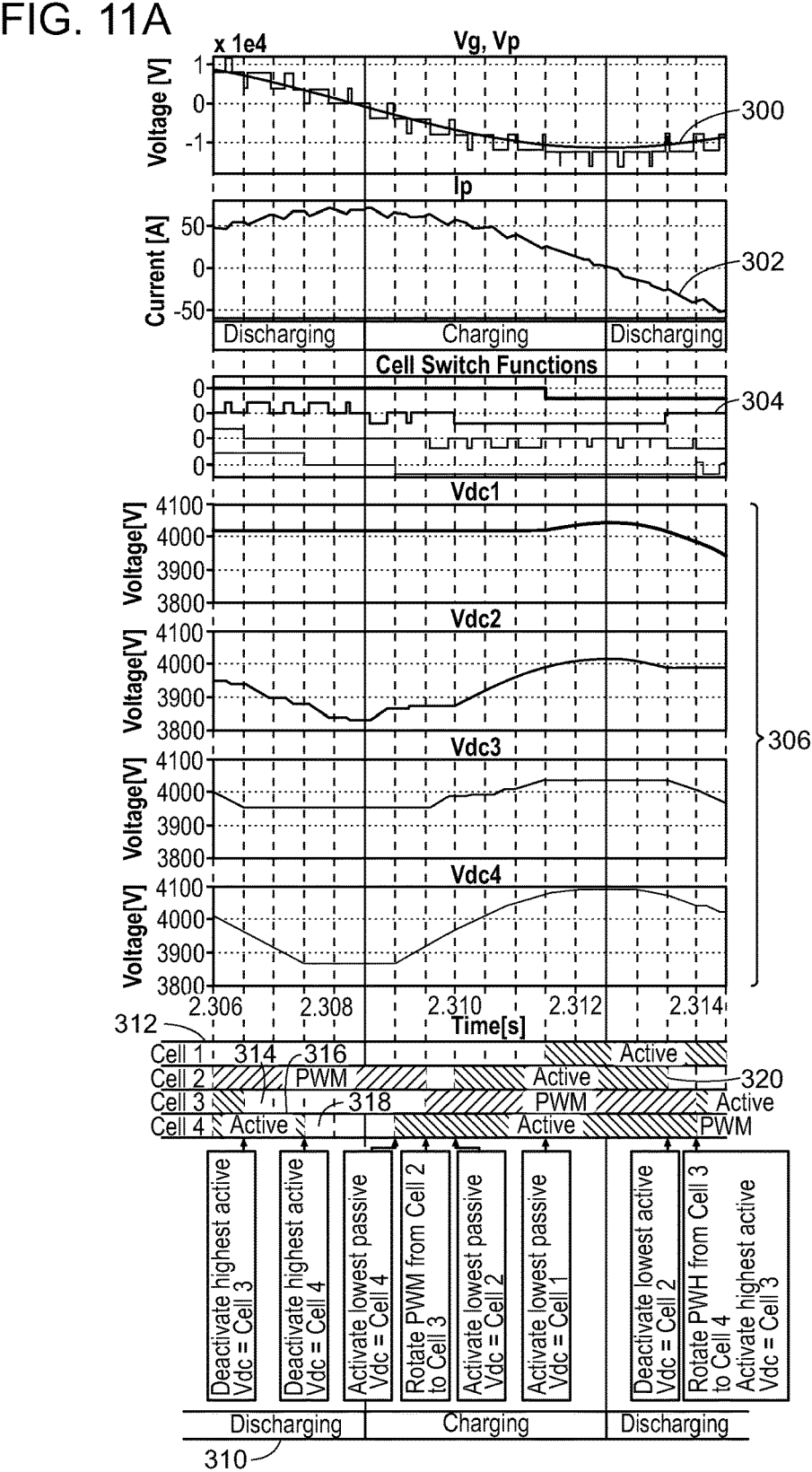

SWITCHING SCHEME FOR STATIC SYNCHRONOUS COMPENSATORS USING CASCADED H-BRIDGE CONVERTERS

FIELD OF INVENTION

The present invention generally relates to static synchronous compensators and more particularly to a switching scheme for low power loss static synchronous compensators using cascaded H-Bridge converters.

BACKGROUND

Static synchronous compensators ("STATCOMs") are power electronic converter systems used for controlling reactive current flow to/from an electric power system. A typical STATCOM is made from a three-phase voltage source inverter with all three legs (also referred to herein as poles or phases) of the inverter connected to the same DC bus. This allows transient power flowing into/out of a given phase to be cancelled out by the power flow out of/into the other two phases, which occurs naturally in STATCOM applications. As a result, the DC bus voltage does not significantly deviate during normal STATCOM operation. The maximum value of the DC bus voltage is limited by the voltage rating of the devices comprising the voltage source inverter. This maximum DC bus voltage then imposes a limit on the AC voltage that can appear between phase legs. Unfortunately, this AC voltage is often too low to directly connect to an electric power system so the use of a step-up transformer is often required to enable operation at higher voltages.

Another type of STATCOM uses a multi-level converter called a cascaded H-Bridge converter (CHB) which enables operation at higher voltages and often eliminates the need for a step-up transformer. This is beneficial since the step-up transformer can be inefficient and lossy. In contrast to the three-phase converter STATCOM described above, CHB STATCOMs are natively single phase; the H-Bridge converters are not connected to the same DC bus. When identical voltages, $V_{dc}$, are used for each capacitor of the cascaded converter, the total converter voltage of a given pole can take any integer multiple of $V_{dc}$ between $-N_{cells} \times V_{dc}$ and $+N_{cells} \times V_{dc}$, where $N_{cells}$ is the number of CHB H-Bridge cells. The total converter voltage is used to control the pole current, which flows through all individual H-Bridge cells in a given leg, since they are connected in series.

Another advantage of CHB STATCOMs is that they more easily create a high fidelity (low harmonic) AC voltage waveform from the lower voltage rated cells in series by virtue of their smaller voltage step size. In addition, the converter can continue to operate even with a failed cell through bypassing (shorting out) the level with the failed cell.

The CHB STATCOMs are switched or modulated according to various switching/modulation schemes to produce a desired output waveform. Typical modulation schemes include staircase modulation, phase shifted modulation, and level shifted modulation. Each of these modulation schemes has benefits as well as disadvantages in relation to four key performance criteria. These criteria are: 1) minimizing the number of switching events to reduce power loss, (2) balancing the isolated capacitor voltages of the CHB cells to keep each cell voltage within safe operating levels, (3) producing a high fidelity AC voltage waveform to minimize the passive filter components on the AC side of the converter, and (4) allowing for even distribution of losses among the CHB cells to prevent accelerated wear out of an individual cell.

With prior art switching schemes, these four objectives are inherently at odds with each other, i.e. improving one or two of these objectives usually comes at the expense of the others. With the staircase switching scheme there are low power losses due to a minimum number of switching events, but there are significant drawbacks, such as poor cell voltage balancing, a low fidelity waveform, and uneven distribution of losses among cells. The phase shifted carrier modulation scheme performs well in most areas, except for power loss, in which case it performs poorly. It is critical to minimize power losses for multiple reasons, including: to minimize STATCOM cost and physical footprint; to maintain low component temperatures; and to maximize component lifetimes. The level shifted carrier modulation scheme performs well in all areas except for the balancing of the capacitor voltages. This is a major detriment for STATCOM applications, since the DC buses are not supplied or balanced by an external power source.

SUMMARY

In one aspect, the invention features a static synchronous compensator with at least one converter pole for producing a first phase of an AC voltage waveform having a fundamental cycle. The first phase of the AC voltage waveform including alternating converter pole charging regions and converter pole discharging regions in each fundamental cycle. The at least one converter pole including a plurality of cascaded H-bridge cells, each of said plurality of cascaded H-bridge cells having a DC voltage source and a plurality of switches. The plurality of switches of each H-bridge cell are capable of being switched to produce a plurality of switching states. There is a controller configured to control the switching states of the plurality of switches of each of the cascaded H-bridge cells based on the voltages of DC voltage sources of the H-bridge cells and on whether the AC waveform is in the converter pole charging region or the converter pole discharging region.

In other aspects of the invention one or more of the following features may be included. The controller may be configured to control the switching states of the plurality of switches of each of the cascaded H-bridge cells each control period of the fundamental cycle to produce a commanded converter voltage, each control period being a fraction of the fundamental cycle. The plurality of switching states of the plurality of switches may comprise active switching states or passive switching states, and wherein the active switching states may be either positive active switching states or negative active switching states. The controller may be configured to receive each current control period the commanded converter voltage and a current of the at least one converter pole and to determine there from whether the first phase of the AC voltage waveform is in the converter pole charging region or the converter pole discharging region in the current control period of the fundamental cycle. The controller may be configured to receive each current control period the voltage of the DC voltage sources of each H-bridge cell and a list of the H-bridge cells which were in the active state in the control period just prior to the current control period.

In yet other aspects of the invention one or more of the following features may be included. If the AC voltage waveform is in the converter pole charging region the controller may be configured in the current control period to determine from the list of the H-bridge cells which were in the active state in the control period just prior to the current control period if the voltage of any of the DC voltage sources of the H-bridge cells in the active state exceeds a threshold voltage level. If the threshold voltage level is exceeded transition such H-bridge cell to the passive state, and for the remaining H-bridge cells maintain for the current control period the switching state of the control period just prior to the current control period. The controller may be configured to determine if the sum of the voltages of the H-bridge cells in the active state is less than the magnitude of the commanded converter voltage and if it is then transition the H-bridge cells from the passive state to the active state in order from lowest voltage level to highest voltage level until the sum of the voltages of the H-bridge cells in the active state is not less than the magnitude of the commanded converter voltage. If the sum of the voltages of the H-bridge cells in the active state is determined to be not less than the magnitude of the commanded converter voltage, the controller may be configured to determine if the sum of the voltages of the H-bridge cells in the active state is more than the magnitude of the commanded converter voltage and if it is then transition the H-bridge cells from the active state to the passive state in order from highest voltage level to lowest voltage level until the sum of the voltages of the H-bridge cells in the active state is not more than the magnitude of the commanded converter voltage. And, the controller may be configured to generate a list of active H-bridge cells for the current control period.

In further aspects of the invention one or more of the following features may be included. If the AC waveform is in the converter pole discharging region the controller may be configured in the current control period to determine from the list of the H-bridge cells which were in the active state in the control period just prior to the current control period if the voltage of any of the DC voltage sources of the H-bridge cells in the active state is less than a threshold voltage level and if the voltage level is less than the threshold voltage level transition such H-bridge cell to the passive state, and for the remaining H-bridge cells maintain for the current control period the switching state of the control period just prior to the current control period. The controller may be configured to determine if the sum of the voltages of the H-bridge cells in the active state is less than the magnitude of the commanded converter voltage and if it is then transition the H-bridge cells from the passive state to the active state in order from highest voltage level to lowest voltage level until the sum of the voltages of the H-bridge cells in the active state is not less than the magnitude of the commanded converter voltage. If the sum of the voltages of the H-bridge cells in the active state is determined to be not less than the magnitude of the commanded converter voltage, the controller may be configured to determine if the sum of the voltages of the H-bridge cells in the active state is more than the magnitude of the commanded converter voltage and if it is then transition the H-bridge cells from the active state to the passive state in order from lowest voltage level to highest voltage level until the sum of the voltages of the H-bridge cells in the active state is not more than the magnitude of the commanded converter voltage. And, the controller may be configured to generate the list of active H-bridge cells for the current control period.

In yet other aspects of the invention one or more of the following features may be included. The controller may be configured to control the switching states of the plurality of switches according to the list of active H-bridge cells generated for the current control period. The controller may further be configured to modulate, during the control period, one of the H-bridge cells using pulse width modulation (PWM), the modulated cell being the PWM cell. The controller may be configured to select the PWM cell based on a count of fundamental cycles of the AC voltage waveform which have been produced and on a segment of the fundamental cycle during which the PWM cell was last modulated. The controller may be configured to compare the magnitude of the commanded converter voltage to the sum the voltages of the list of active H-bridge cells generated for the current control period and modulate the PWM cell with a duty cycle to produce a PWM cell voltage substantially equal to the voltage difference between the magnitude of the commanded converter voltage and the sum the voltages of the list of active H-bridge cells generated for the current control period. The controller being configured to determine if the sum of the voltages of the H-bridge cells in the active state is less than the magnitude of the commanded converter voltage may include adding a cell voltage of the PWM cell. The plurality of cascaded H-bridge cells comprises any integer number of H-bridge cells.

In other aspects of the invention one or more of the following features may be included. There may be a second converter pole for producing a second phase of an AC voltage waveform having a fundamental cycle, the second phase of the AC voltage waveform including alternating converter pole charging regions and converter pole discharging regions in each fundamental cycle. The second converter pole may include a plurality of cascaded H-bridge cells, each of said plurality of cascaded H-bridge cells having a DC voltage source and a plurality of switches; wherein the plurality of switches of each H-bridge cell are capable of being switched to produce a plurality of switching states. The controller may be configured to control the switching states of the plurality of switches of each of the cascaded H-bridge cells based on the voltages of DC voltage sources of the H-bridge cells and on whether the second phase of the AC waveform is in the converter pole charging region or the converter pole discharging region. There may be a third converter pole for producing a third phase of an AC voltage waveform having a fundamental cycle, the third phase of the AC voltage waveform including alternating converter pole charging regions and converter pole discharging regions in each fundamental cycle. The third converter pole may include a plurality of cascaded H-bridge cells, each of said plurality of cascaded H-bridge cells having a DC voltage source and a plurality of switches; wherein the plurality of switches of each H-bridge cell are capable of being switched to produce a plurality of switching states. The controller may be configured to control the switching states of the plurality of switches of each of the cascaded H-bridge cells based on the voltages of DC voltage sources of the H-bridge cells and on whether the third phase of the AC waveform is in the converter pole charging region or the converter pole discharging region.

In yet other aspects of the invention one or more of the following features may be included. The controller may be further configured to modulate, during the control period, one of the H-bridge cells in each of the first, second, and third converter poles using pulse width modulation (PWM), the modulated cells being the PWM cells. The controller may be further configured to modulate, during the control period, one of the H-bridge cells in two converter poles of the first, second and third converter poles using pulse width modulation (PWM), the modulated cells being the PWM cells; and wherein the two converter poles of the first, second and third converter poles having PWM cells are changed periodically. The first, second and third converter poles may be connected in a WYE point floating topology.

In another aspect, the invention features a static synchronous compensator including at least one converter pole for producing a first phase of an AC voltage waveform having a fundamental cycle. The first phase of the AC voltage waveform including alternating converter pole charging regions and converter pole discharging regions in each fundamental cycle. The at least one converter pole including a plurality of cascaded H-bridge cells, each of said plurality of cascaded H-bridge cells having a DC voltage source and a plurality of switches. The plurality of switches of each H-bridge cell are capable of being switched to produce a plurality of switching states. There is a controller configured to control the switching states of the plurality of switches of each of the cascaded H-bridge cells every control period of the fundamental cycle to produce a commanded converter voltage, wherein each control period is a fraction of the fundamental cycle. The controller being configured to maintain for the current control period the switching state of each of the cascaded H-bridge cells of the control period just prior to the current control period unless a predetermined condition is determined based on the voltages of the DC voltage sources of the H-bridge cells and on whether the AC waveform is in the converter pole charging region or the converter pole discharging region.

In other aspects of the invention the following feature may be included. The plurality of cascaded H-bridge cells may comprise any integer number of H-bridge cells.

An object of this invention is to provide a low power loss CHB STATCOM utilizing a simple switching scheme that achieves good performance in the four key performance criteria.

DESCRIPTION OF DRAWINGS

FIG. 3 depicts the switching states of the single cell of a cascaded H-bridge STATCOM of FIG. 2;

FIGS. 8A-1 to 8A-3 depict the control algorithm implemented by the controller of one phase of the cascaded H-bridge STATCOM of FIG. 1;

FIG. 8B depicts certain alternate steps of the control algorithm of FIG. 8A;

FIGS. 10A-1 and 10A-2 depict the simulation results for a four-cell cascaded H-bridge STATCOM circuit according to this invention using a PWM cell;

FIGS. 10B-1 and 10B-2 depict the simulation results for a four-cell cascaded H-bridge STATCOM circuit according to this invention without using a PWM cell;

FIG. 11A depicts the output voltage waveform, output current waveform, the cell switch functions, and DC voltages across each cell of the four cell H-bridge according to this invention using a PWM cell.

DETAILED DESCRIPTION

The general purpose of the invention is to provide a low power loss CHB STATCOM which utilizes a switching scheme that achieves good performance with regard to four key performance criteria; namely, minimizing the number of switching events, balancing capacitor voltages of the CHB cells, producing a high fidelity AC voltage waveform, and allowing for even distribution of losses among the CHB cells.

Figure 1:
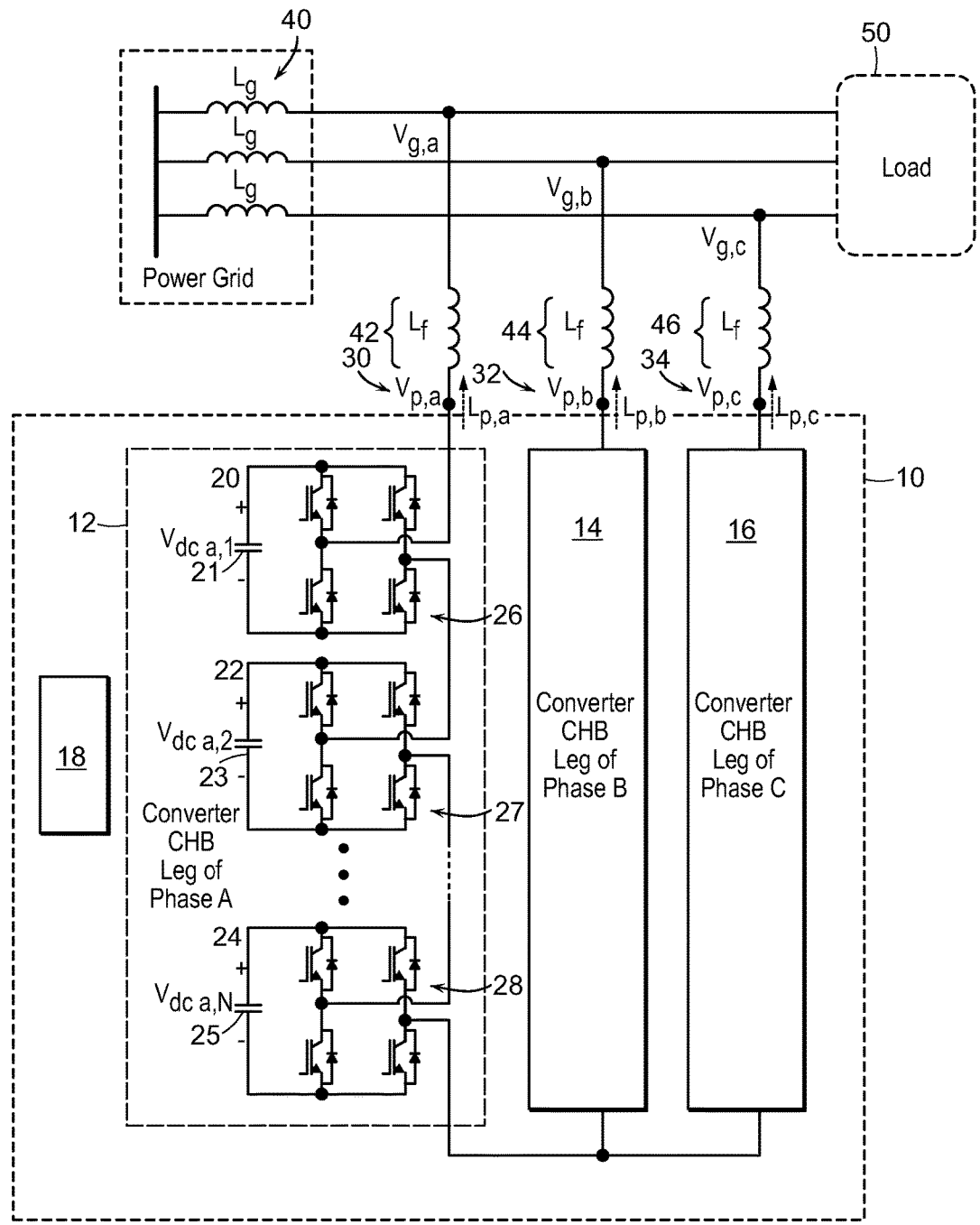
FIG. 1 is a schematic diagram of a three phase cascaded H-bridge STATCOM according to an aspect of this invention.

A three phase CHB STATCOM 10 according to an aspect of this invention is shown in FIG. 1 to include three converter legs or phases 12 (Phase A), 14 (Phase B), and 16 (Phase C), which are operated under the control of controller 18, which may be a digital signal processor operating a digital control system typically sampled in the range of 500 Hz to 3 kHz. Each leg/phase includes N cascaded H-bridge converter cells, such as cells 20, 22, and 24 of leg/phase 12, connected in series to form Phase A output 30. Phase A output 30 is connected to phase A of power grid 40 through filter inductor 42. Converter legs or phases 14 (Phase B) and 16 (Phase C) each include N cascaded H-bridge cells (not shown) which form Phase B output 32 and Phase C output 34. Phases B and C are also connected to their respective phases of power grid 40. The outputs of converter legs or phases 12, 14 and 16 typically pass through filters 42, 44, and 46, respectively, to reduce harmonic content. The three phases of power grid 40 are shown to be connected to a load 50 which is representative of the aggregate of all individual loads connected to power grid 40.

For each H-bridge cell of a converter phase/leg of CHB STATCOM 10, identical capacitors having the same nominal voltage, $V_{dc}$, are used. For example, each cascaded converter cell (20, 22, and 24), has an identical capacitor (21, 23, and 25), each with a bus voltage of $V_{dc}$. Depending on the switching state of each cell, the total instantaneous converter leg/phase voltage $V_p$ can be an integer multiple of $V_{dc}$ between $-N_{cells} \times V_{dc}$ and $+N_{cells} \times V_{dc}$. The total converter leg/phase voltage ($V_P$) is used to control the leg/phase current ($I_P$), which flows through all individual H-Bridge cells in a given leg. Each converter cell 20, 22, and 24 also includes a plurality of switches 26, 27, and 28 connected in the H-bridge configuration and switched using controller 18 to produce a desired waveform on output 30. Maintaining a balanced dc voltage across the individual H-Bridge cell capacitors 21, 23, and 25 is one of the requirements of a switching or modulation strategy for a CHB STATCOM. Ideally the leg/phase current is 90 degrees leading or lagging the inverter leg/phase voltage, but in practice a small part of the current is in phase with the voltage to make up for losses in the converter leg/phase.

Figure 2:
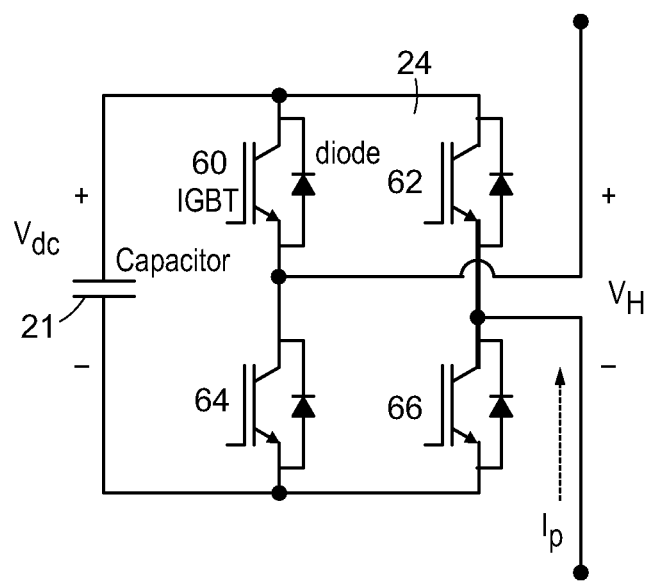
FIG. 2 is a schematic diagram of a single cell of cascaded H-bridge STATCOM of FIG. 1.

A single H-Bridge cell, e.g. H-Bridge cell 20, is shown in more detail in FIG. 2 to include capacitor 21 and a plurality of switches 24. In this example, the switches comprise four IGBT transistor/diode pairs 60, 62, 64, and 66 connected in an H bridge configuration. IGBT transistor/diode pairs 60 and 64 are connected in series across capacitor voltage $V_{dc}$ with IGBT transistor/diode pair 60 being connected at its first end to $+V_{dc}$ and IGBT transistor/diode pair 64 being connected at its first end to $-V_{dc}$. The second ends of IGBT transistor/diode pairs 60 and 64 being connected to each other and to the positive terminal of H-Bridge cell 20, $+V_H$. IGBT transistor/diode pairs 62 and 66 are connected in series across capacitor voltage $V_{dc}$ with IGBT transistor/diode pair 62 being connected at its first end to $+V_{dc}$ and IGBT transistor/diode pair 66 being connected at its first end to $-V_{dc}$. The second ends of IGBT transistor/diode pairs 62 and 66 being connected to each other and to the negative terminal of H-Bridge cell 20, $-V_H$.

During normal operation, the H-Bridge cell 20, FIG. 2, has four valid combinations of individual IGBT commands or "cell switch states". The four cell switch states are depicted in FIG. 3. In state 1, IGBT transistor/diode pairs 60 and 66 are switched on and IGBT transistor/diode pairs 62 and 64 are switched off. In state 2, IGBT transistor/diode pairs 62, and 64 are switched on and IGBT transistor/diode pairs 60 and 66 are switched off. In state 3, IGBT transistor/diode pairs 60 and 62 are switched on and IGBT transistor/diode pairs 64 and 66 are switched off. Finally, in state 4, IGBT transistor/diode pairs 64 and 66 are switched on and IGBT transistor/diode pairs 60 and 62 are switched off Other combinations of IGBT switch states beyond these four are valid during cell test or bypass.

Each of these four cell states has a different effect on the total converter leg/phase voltage ($V_p = \Sigma V_{H's}$), and a different impact on how the leg/phase current, $I_P$, goes through the individual cells' DC bus capacitors. States 1 and 2 are "active" states and add either positive or negative capacitor voltage ($+V_{dc}$ or $-V_{dc}$) to the total converter voltage. The pole voltage on an individual cell, $V_H = +V_{dc}$ (State 1) or $V_H = -V_{dc}$ (State 2), respectively. And, given the direction of the pole current, $I_p$, states 1 and 2 either discharge or charge the DC bus capacitors: $I_c = -I_p$ (State 1) or $I_c = +I_p$ (State 2), respectively. If current, $I_p$, were flowing in the opposite direction, the relationship between the polarity of applied voltage and capacitor charging current would flip. States 3 and 4 are "passive" or "zero voltage" states and they add zero voltage to the total converter pole voltage, also having no effect on their respective DC bus capacitor voltage or current. Thus, $V_H = 0$ and $I_c = 0$ for both State 3 and State 4.

Controller 18 of CHB STATCOM 10 as depicted in FIG. 1 above coordinates the operation of all of the H-bridge cells of converter legs 12, 14, and 16 using a particular switching scheme or strategy to produce a desired output waveform. Several known switching strategies are described below with regard to FIGS. 4-6.

Staircase Modulation

Figure 4:
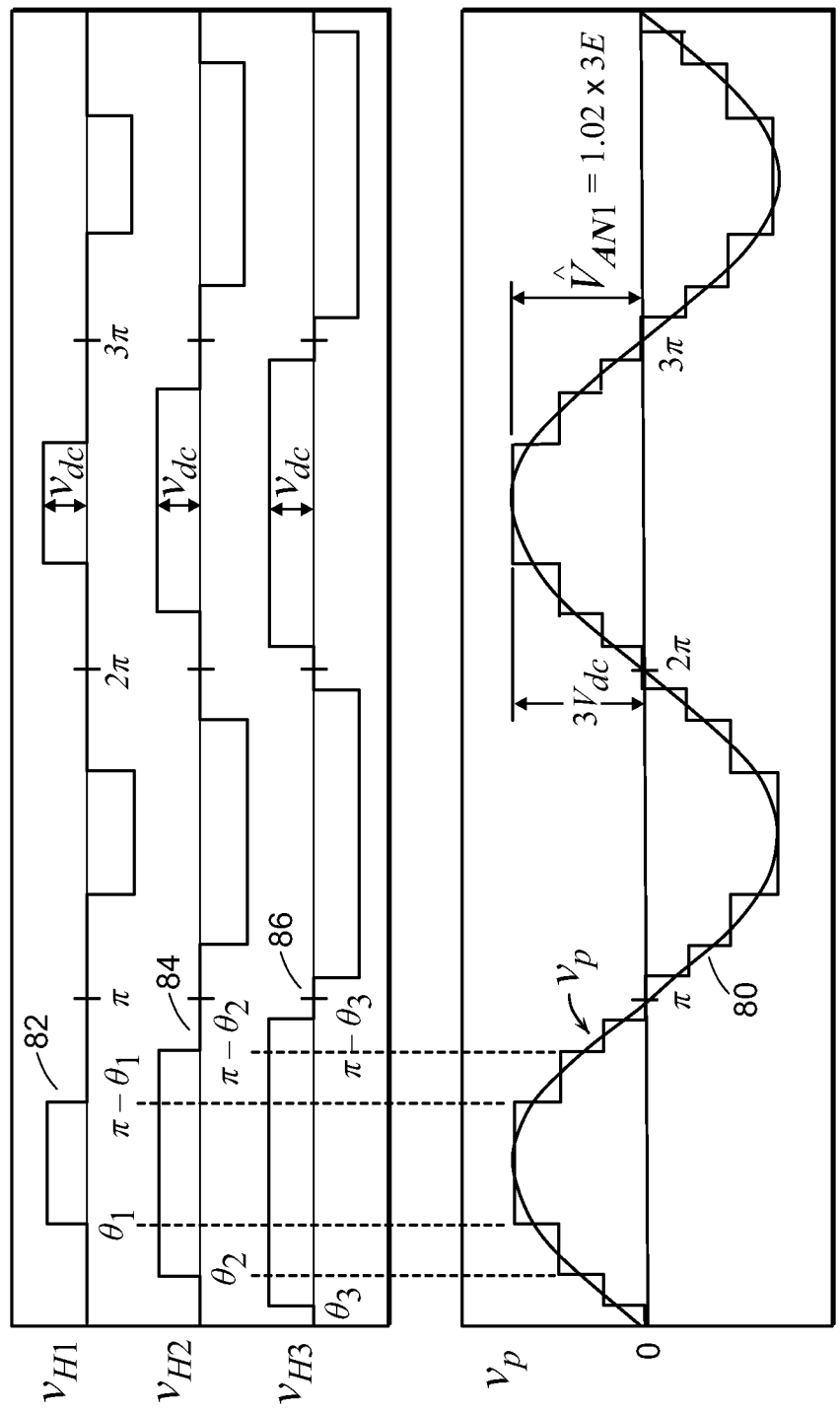
FIG. 4 depicts the output waveform of one phase of a cascaded H-bridge STATCOM using staircase modulation.

Output waveform 80, $V_P$, FIG. 4, represents one phase produced by CHB STATCOM 10, such as output 30, FIG. 1. With this switching algorithm, as shown by waveforms 82, 84, and 86, the H-Bridge cells are added consecutively at +100% duty (e.g. switch state 1="locked" ON until no longer needed) as the required inverter voltage progresses up in amplitude through the total stack of cell voltages. The mirror image happens for negative required inverter voltages (-100% duty). This produces a voltage waveform, $V_p$, that has marginally acceptable harmonic quality and very low switching losses due to the very minimal number of times the cells transition. However, because a cell can be brought into operation for a very long time, the charging/discharging of that cell's capacitor voltage can cause the respective DC buses to deviate significantly from a safe level. Stated in a different way, this modulation scheme, due to limited switching of cells, does not allow for balancing of cell voltages within a 50/60 Hz cycle. It is possible to re-order the sequence of addition/removal of cells on a half (or quarter) cycle basis, or reorder them across multiple line cycles, but this still results in significant DC bus movement. Thus, this switching algorithm requires very large (and costly) DC capacitors to make it feasible for use in a STATCOM. In addition the AC harmonic quality is not particularly good, necessitating a large and costly filter inductor, L, or harmonic filter.

Phase Shifted Carrier Modulation

Figure 5:
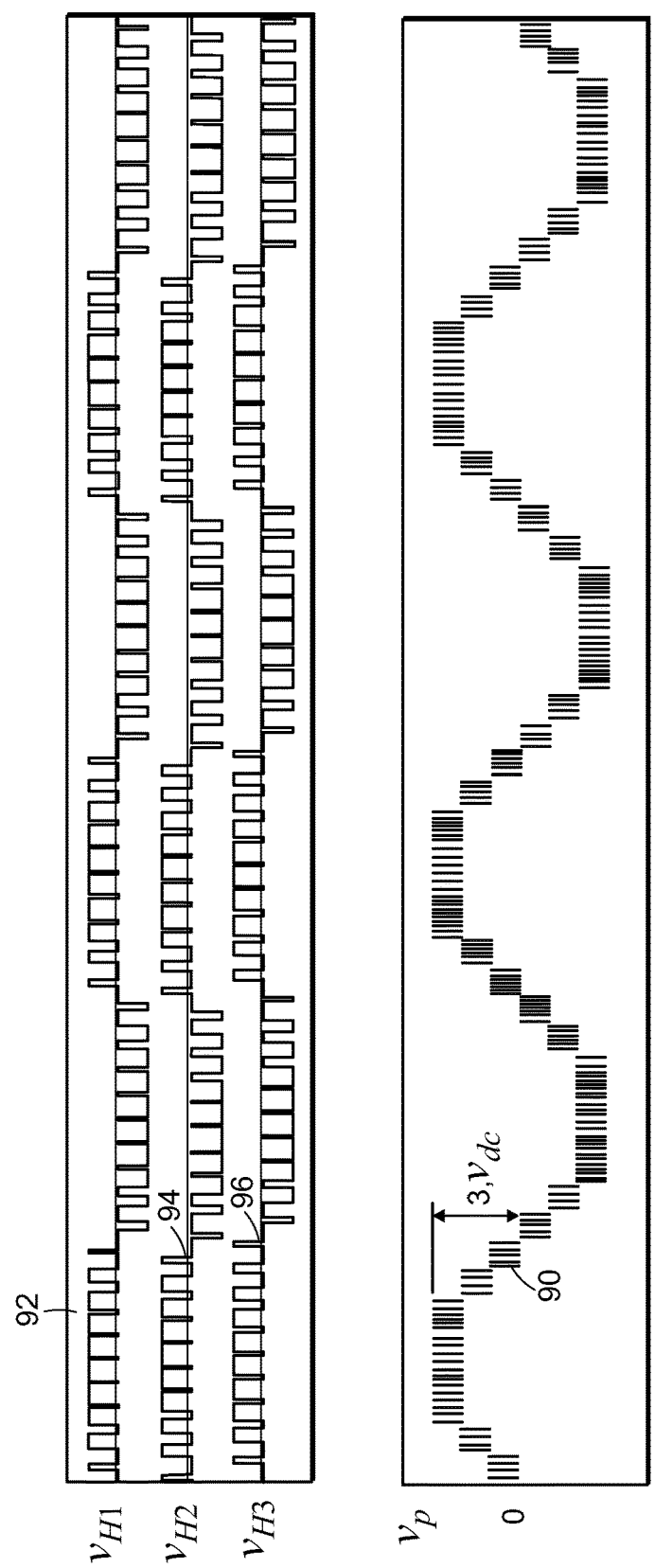
FIG. 5 depicts the output waveform of one phase of a cascaded H-bridge STATCOM using phase shifted carrier modulation.
Figure 6:
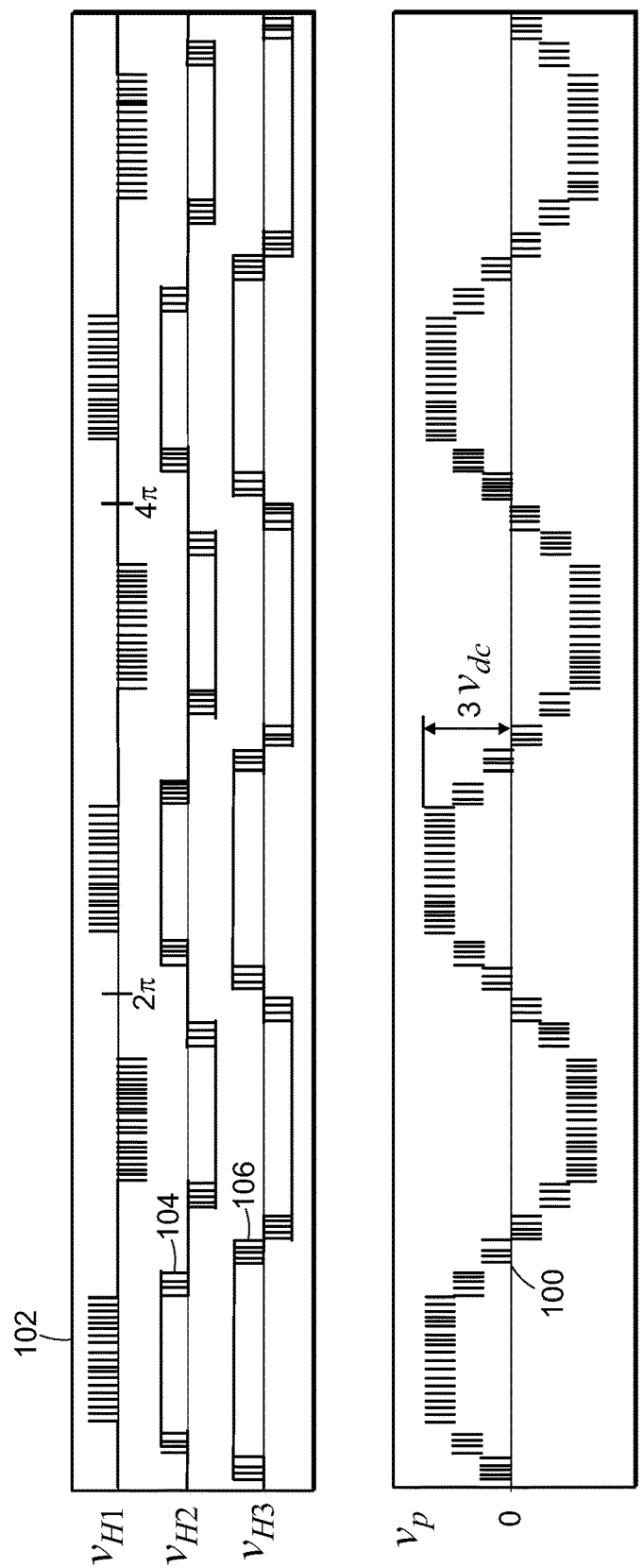
FIG. 6 depicts the output waveform of one phase of a cascaded H-bridge STATCOM using level shifted carrier modulation.

Phase Shifted Modulation is a carrier-based switching strategy. Carrier strategies compare the desired total CHB STATCOM voltage, $V_{p,cmd}$, with a set of high frequency triangle "carrier" waveforms (1 carrier waveform per cell). The result of this comparison process is a discrete output, {+1, 0, −1}, that determines which of the 4 switch states a given cell will take during the next carrier period. This is also known as Pulse Width Modulation, PWM. The carrier frequency is typically much higher than the fundamental frequency (50, 60 Hz), commonly 10 to 40 times higher (e.g. $f_{carrier} \rightarrow 600$ kHz to 2 kHz). An example of phase shifted carrier switching frequency (600 Hz carrier) is shown in FIG. 5 as output waveform 90. As can be seen, there are a high number of switching events per cycle (40 transitions for each cell at 10× fundamental frequency), as depicted by waveforms 92, 94, and 96. The resulting CHB inverter pole voltage, $V_p$, has good fidelity to the commanded sine wave (e.g. all of the harmonics are at or above the carrier frequency), allowing the filter inductor, L, to be relatively small. Unfortunately the large number of total switching events (cumulative, across all cells) creates excessive power loss for the generation of this voltage waveform.

Another advantage of phase shifted carrier modulation is more even "sampling" from each of the cells of the CHB, thereby producing an even charging and discharging of the DC bus voltage across all of the cells. In practice, component and timing variation from cell to cell (variations in C value, conduction drop, switching times, etc.) necessitate an auxiliary control loop to maintain equal DC bus voltages. This even sampling also naturally balances the losses across cells, preventing uneven heating and wear-out of the IGBT/diodes.

Level Shifted Carrier Modulation

Level Shifted Modulation is another carrier-based switching strategy. Similar to the phase shifted carrier modulation above, each of the carriers is vertically offset (e.g. "level") before comparison with the required pole voltage to produce the {+1, 0, −1} discrete output for each cell. In some ways this third strategy is a hybrid of staircase and phase shifted modulation. An illustration of the mechanics of the level shifted carrier strategy is shown by waveform 100, FIG. 6, using a level shifted carrier switching frequency of 600 Hz. The cell voltage waveforms are shown as 102, 104, and 106. Similar to the staircase modulation, there are significant periods of time where an individual cell is conducting the pole current (waveform 106 and to a lesser extent waveform 104) causing large imbalances in the different DC bus capacitor voltages. Similarly the devices in the different cells are loaded differently, causing the need to rotate the carriers and loading between fundamental cycles or else face uneven IGBT/diode wearout.

Like the phase shifted carrier modulation the level shifted carrier modulation provides a voltage, $V_p$, with good fidelity to the commanded sine wave, so the AC filter inductor size can be small. However, the cumulative number of switching events per fundamental cycle is not as high as phase shifted carrier, leading to better overall losses.

Modulation Scheme According to an Aspect of the Invention

The switching strategy according to an aspect of this invention, implemented on controller 18 of CHB STATCOM 10, is based on several principals of operation which are described below. For simplicity, the description below is limited to a single leg/phase converter of CHB STATCOM 10, since the operation of the other legs/phases is the same other than the phase of the output waveforms.

Figure 7:
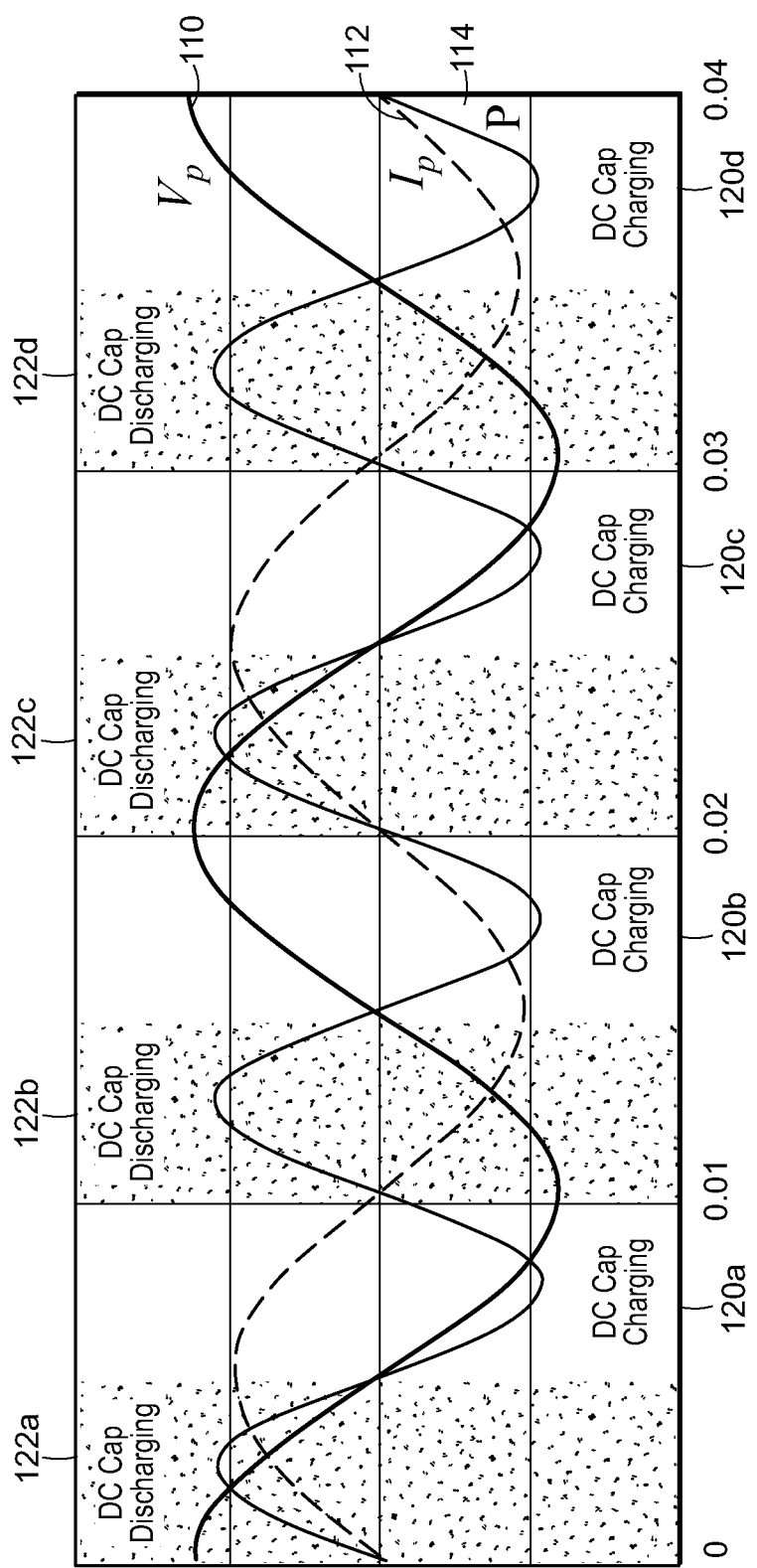
FIG. 7 depicts the output voltage, current and power waveforms of one phase of a cascaded H-bridge STATCOM according to an aspect of this invention.

Principal 1—Charge/Discharge Regions. The AC voltage and current waveforms for a single leg/phase converter, such as leg/phase 12 of CHB STATCOM 10, are depicted in FIG. 7 as waveforms 110 and 112, respectively. Additionally, the instantaneous power, $P(t)=V_p(t) \times I_p(t)$, is shown as waveform 114. It is clear that on an instantaneous basis, the power into (out of) the single leg/phase converter is not constant, but rather it is oscillating. This is not an artifact of any particular control or modulation scheme, but rather an inherent physical result of producing a sinusoidal current from a single phase storage element, the DC capacitors. As a result of this power oscillation, there are distinct regions in each fundamental cycle of the waveforms 110 and 112 where the DC bus capacitors are naturally charging (regions 120a-d) and discharging (regions 122a-d). When $P(t)=V_p(t) \times I_p(t)<0$ the DC bus capacitors are naturally charging and when $P(t)=V_p(t) \times I_p(t)>0$ the DC bus capacitors are naturally discharging. This charge-discharge property is true for both inductive and capacitive VAR output from CHB STATCOM 10, with corresponding phase shift. Thus, the modulation strategy according to this invention considers these 2 different regions of the output waveform: "charging" and "discharging".

Principal 2—Minimize Switching Events and Use Such Switching Events to Balance DC Bus Voltages. From the staircase switching strategy described above, it is known that it is desirable to minimize the number of switching events for all H-bridge cells. This is achieved in the following manner. Each H-bridge cell switch state is "carried over" between subsequent control periods (similar to carrier periods—about 500 Hz to 3 kHz). The switch states are changed under only two circumstances:

1. If the DC bus voltage of a given "active" H-bridge cell deviates too far (beyond a hysteresis band, $\Delta V_{hysteresis}$) from the furthest of the other cell DC bus voltages; or
2. If more (or fewer) H-bridge cells are required to be active in order to make the commanded output waveform voltage, $V_{p,cmd}$.

If one of these conditions is met, and switching is required, H-bridge cells are selected for activation (or deactivation) so as to bring all of the cell voltages closer together. This is achieved in the charging region by activating passive cells that have the lowest DC bus voltage first, and conversely deactivating active cells that have highest DC bus voltage last. In the discharging region the reverse is implemented—activating passive cells that have the highest DC bus voltage first, and deactivating active cells that have lowest DC bus voltage first.

Principal 3—AC Harmonic Quality and Balanced Losses Across Cells. Finally, there is an additional and optional principal, which may be incorporated in order to insure high quality AC harmonics and rotated losses amongst H-bridge cells. This optional principal is that one of the H-bridge cells of each leg/phase of CHB STATCOM 10 may be operated using pulse width modulation. Since the other H-bridge are necessarily "locked" into one of their 4 states (e.g. $=+100\%$, $0\%$, or $-100\% \times V_{dc}$) for the entire control period, the average converter pole voltage will be an indexed step of the DC bus voltages, and not necessarily equal to the commanded voltage, $V_{p,cmd}$. As such, one cell may be designated as "PWM cell" and the duty cycle (+/−% ON time) will be determined to make up the difference from the commanded voltage, $V_{p,cmd}$, and the sum of all "active" H-bridge voltages. This will insure high AC harmonic voltage quality. Since the "PWM cell" will necessarily switch one or more times in a given control period, the switching losses will be higher. Therefore, the role of "PWM cell" is rotated amongst all of the CHB H-bridge cells so as to encourage even total losses across cells.

Figures 1, 8A:
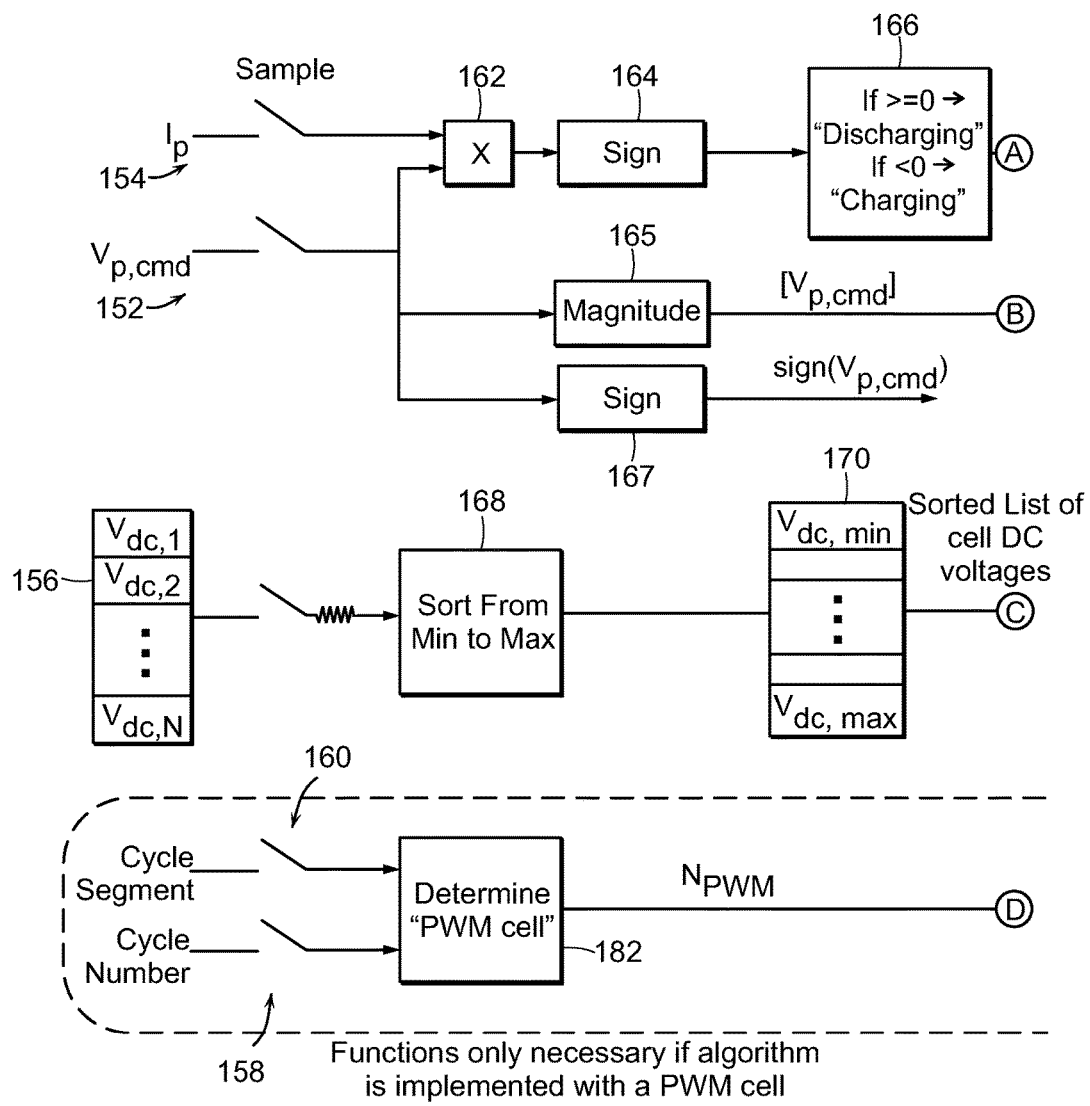
Figures 2, 8A:
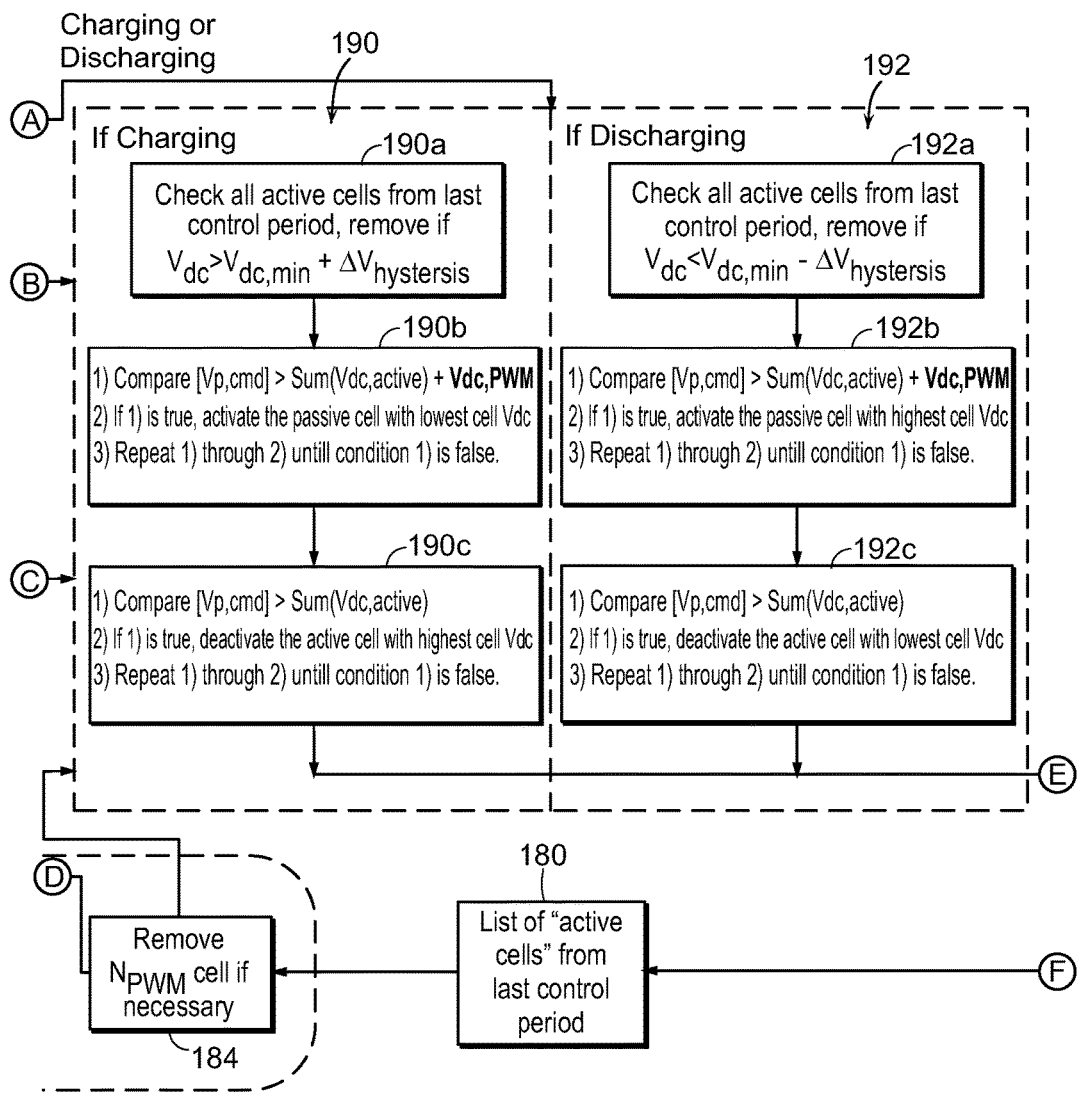
Figures 3, 8A:
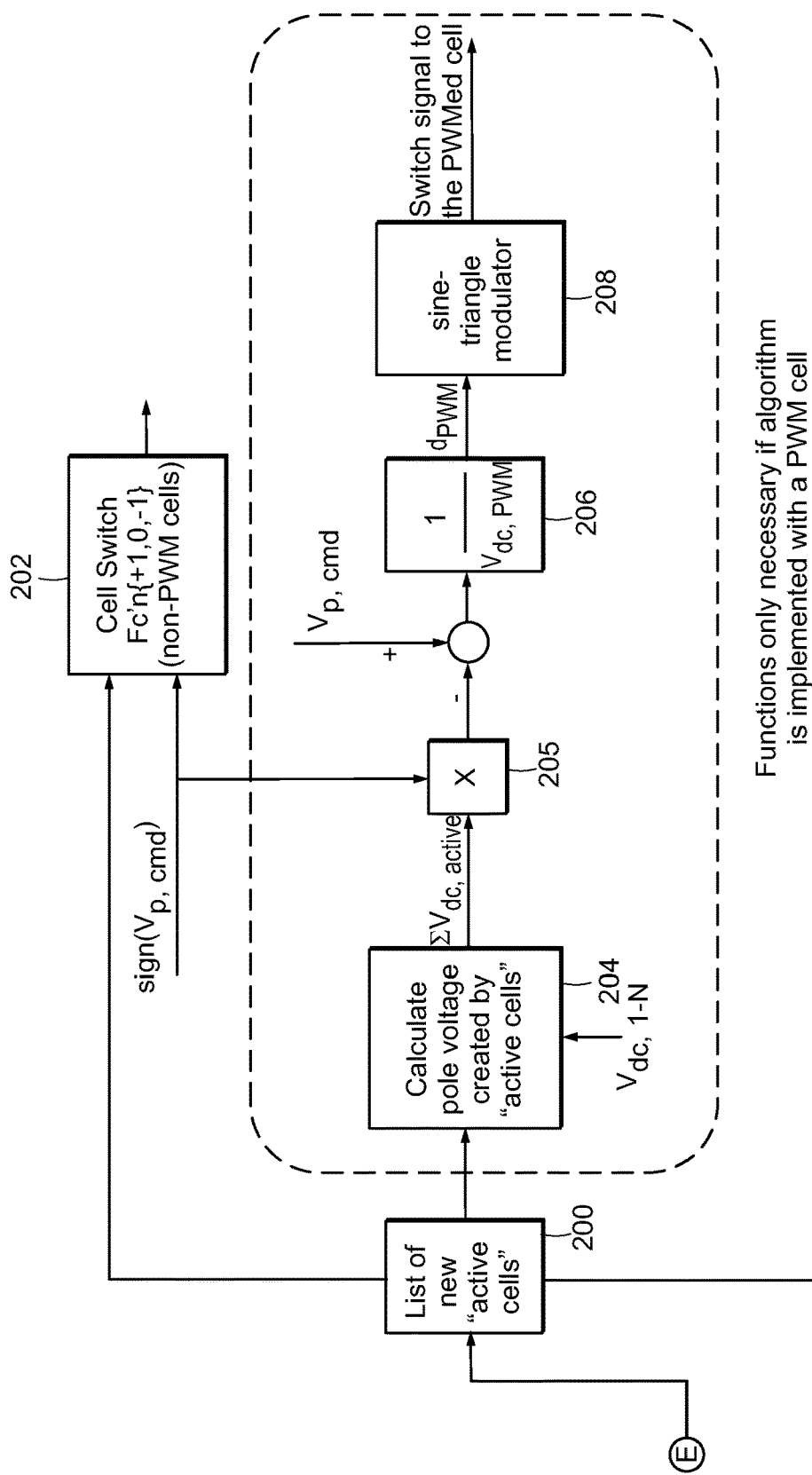

Utilizing the above principals, switching algorithm 150, FIG. 8A, according to this invention is implemented in controller 18, FIG. 1, and executed at a regular control period, typically on the order of 500 Hz to 3 kHz. The steps described below occur once per control period.

Figure 9:
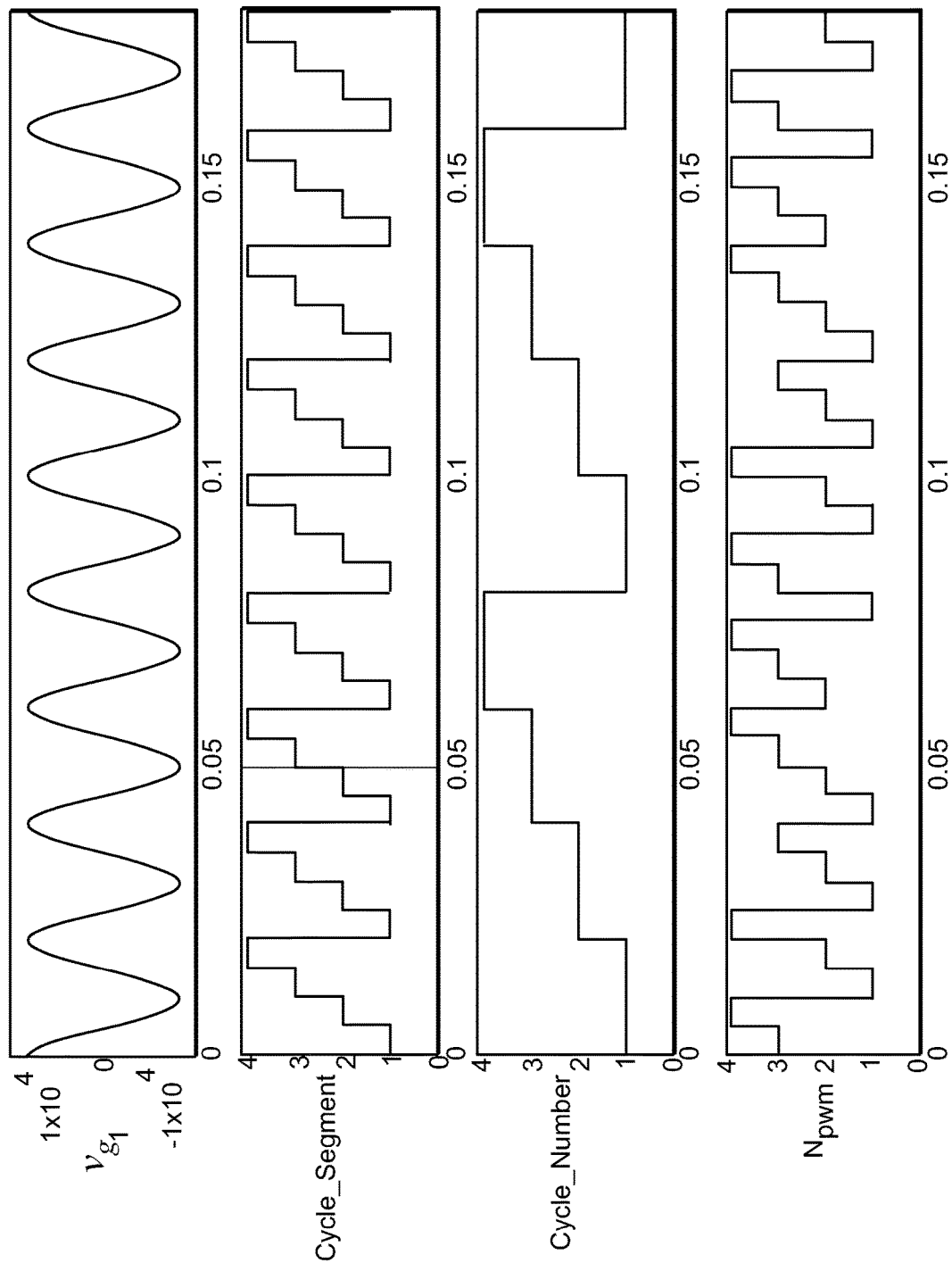
FIG. 9 depicts cycle number count of the fundamental AC voltage period and the cycle segment count of each period.

The commanded inverter voltage, $V_{p,cmd}$ from the regulator (not shown) of CHB STATCOM 10 is sampled at 152. In addition, the pole current 154, $I_p$, and all H-Bridge cell DC bus voltages 156, $V_{dc}$, are sampled. If the PWM cell is implemented, the cycle number 158 (integer, from 1 to $N_{cells}$) and the cycle segment number 160 (integer, 1 to $N_{cells}$) are calculated. The cycle segment is a count up from 1 to $N_{cells}$ for every equal fraction of a fundamental period of the AC waveform, $V_{ac}$. The cycle numbers counts the number of complete periods of the fundamental AC waveform, from 1 up to $N_{cells}$. This rolls over to 1 again after Ncell complete periods of the fundamental AC waveform. Examples of both for $N_{cells}=4$ are shown in FIG. 9, along with the resulting value for the PWM cell number, $N_{PWM}$.

At 162 the pole current 154, $I_p$, is multiplied by the commanded inverter voltage 152, $V_{p,cmd}$, producing the instantaneous power and the polarity (sign) of $V_{p,cmd} \times I_p$ is calculated at 164 to determine at 166 if the inverter is "charging" or "discharging". At step 165 and 167 the magnitude and sign, respectively of the commanded inverter voltage 152, $V_{p,cmd}$ are determined for use in steps 190, 192, 202, as described below. And, at step 168 the DC bus voltages from 156 are sorted from minimum to maximum value and stored at 170 with corresponding cell numbers.

At step 180, the list of active and passive cells, are "carried-over" from the previous control period. The PWM cell, $N_{PWM}$, is determined at 182, using the cycle number 158 and cycle segment 160. The calculation of the PWM cell, $N_{PWM}$, is as follows:

$$N_{PWM}=\text{mod}(\text{Cycle\_Segment}+\text{Cycle\_Number},4)+1,$$

where mod is the modulus function. It should be noted that other methods of selecting the PWM cell may used. For example, a random number generator for generating numbers between 1 and Ncells could be used to vary the PWM cell and evenly spread switching losses among the cells.

At 184 using the list of default states (active/passive) for each cell from 180 and the determined $N_{PWM}$ from 182, the cell designated to be the "PWM cell" is removed from list of available "active" and "passive" cells and the list of remaining active cells is provided for use in steps 190 and 192.

The PWM cell is used later in 204, 206 and 208, augmenting the CHB phase leg voltage produced from 190 and 192, in order to precisely achieve the commanded $V_{p,cmd}$. With this approach for pulse width modulation, as shown in FIG. 9, the 360 degree fundamental AC voltage period is divided into $N_{cell}$ equal time segments. Each cell performs PWM operation once per fundamental period of the AC waveform $V_{ac}$ (once per time segment or $1/N_{cell}$'th of the 360 cycle) on average over a large number of fundamental AC waveform periods. In addition, each cell's segment of PWM rotates position within the period across subsequent fundamental periods. This insures that each cell PWMs during both high and low current amplitude parts of the fundamental current waveform. Alternative approaches can be used to select "PWM cell" so as to guarantee loss balancing.

Referring again to FIG. 8A, steps 190 and 192 are described as follows when the PWM cell is implemented. If the inverter is in a "charging" region, then at steps 190a-c the following occurs:

190a—All active cells are checked and "active" cells are moved to "passive" if their DC bus voltage is greater than the minimum of all cell voltages (from step 170 above), plus some hysteresis band.

190b—If the magnitude of the sum of the "active" DC bus voltages plus the DC bus voltage of the PWM cell is less than the commanded $V_{p,cmd}$ magnitude (e.g. $V_{p,cmd}$ is increasing in magnitude, or there is too little cell voltage from "carry-over"), cells are moved from "passive" to "active" group (i.e. activated), in order from lowest voltage to highest voltage. E.g. the "passive" cell with the lowest DC voltage is added first, $2^{nd}$ lowest DC voltage cell is added next, and so on, etc. This is done until the condition "not enough active cell AC voltage" is false.

190c—If the magnitude of the sum of the "active" DC bus voltage is greater than the commanded $V_{p,cmd}$ magnitude (e.g. $V_{p,cmd}$ is decreasing in magnitude, or there is too much cell voltage from "carry-over" active cells), cells are moved from "active" to "passive" group (i.e. deactivated) in order from highest voltage to lowest voltage. Eg. the "active" cell with the highest DC voltage is removed $1^{st}$, $2^{nd}$ highest DC voltage cell is removed next, and so on, etc. This is done until the condition "too much active cell AC voltage" is false.

If, alternatively, the inverter is in a "discharging" region, then at steps 192a-c the following occurs:

192a—All active cells are checked and "active" cells are moved to "passive" if their DC bus voltage is less than the maximum of all cell voltages (from step 170 above), minus some hysteresis band.

192b—If the magnitude of the sum of the "active" DC bus voltages plus the DC bus voltage of the PWM cell is less than the commanded $V_{p,cmd}$ magnitude (e.g. $V_{p,cmd}$ is increasing in magnitude, or there is too little cell voltage from "carry-over"), cells are moved from "passive" to "active" group (i.e. activated), in order from highest voltage to lowest voltage. E.g. the "passive" cell with the highest DC voltage is added first, $2^{nd}$ highest DC voltage cell is added next, and so on, etc. This is done until the condition "not enough active cell AC voltage" is false.

192c—If the magnitude of the sum of the "active" DC bus voltage is greater than the commanded $V_{p,cmd}$ magnitude (e.g. $V_{p,cmd}$ is decreasing in magnitude, or there is too much cell voltage from "carry-over" active cells), cells are moved from "active" to "passive" group (i.e. deactivated) in order from lowest voltage to highest voltage. E.g. the "active" cell with the lowest DC voltage is removed $1^{st}$ $2^{nd}$ lowest DC voltage cell is removed next, and so on, etc. This is done until the condition "too much active cell AC voltage" is false.

At step 200, the output of step 190 or 192 is used to establish the "new" list of active cells for the current period, which list is then provided to 202. With the sign of the commanded voltage, $V_{p,cmd}$, from step 167 the state of the of each of the active non-PWM cells cells {e.g. +1 or −1 for "state 1" or "state 2"} for the current period is set.

For the PWM cell as determined in step 182, the duty cycle of the PWM cell must be determined. At step 204, the sum of the voltages of the active cells is obtained and the sign of the commanded voltage is applied at step 205 to the sum of the voltages of the active cells from step 204. Then, the commanded voltage, $V_{p,cmd}$ and the sum of the active cell voltages are input to step 206 where the duty cycle of the "PWM cell", $d_{PWM}$, is calculated as follows:

$$d_{PWM} = \frac{V_{p,cmd} - \text{sign}(V_{p,cmd}) \times \sum V_{dc,active}}{V_{dc,PWM}}$$

The calculated duty cycle is input to PWM cell modulator 208 to modulate the PWM cell for the current period. As will be apparent to one skilled in the art, alternate methods of calculating the duty cycle of the "PWM cell" may be used.

It should be noted that as described herein, the polarity of the PWM cell is the same as the polarity of the commanded inverter pole voltage. It may, however, be implemented using either polarity. The PWM cell duty cycle polarity could be either positive or negative, with corresponding adjustments in the number of active cells depending on the polarity used.

If the PWM cell is not implemented, steps 190b,c and 192b,c must be modified to remove the use of the PWM cell in the process. The modified steps are set forth in FIG. 8B.

Figures 1, 10A:
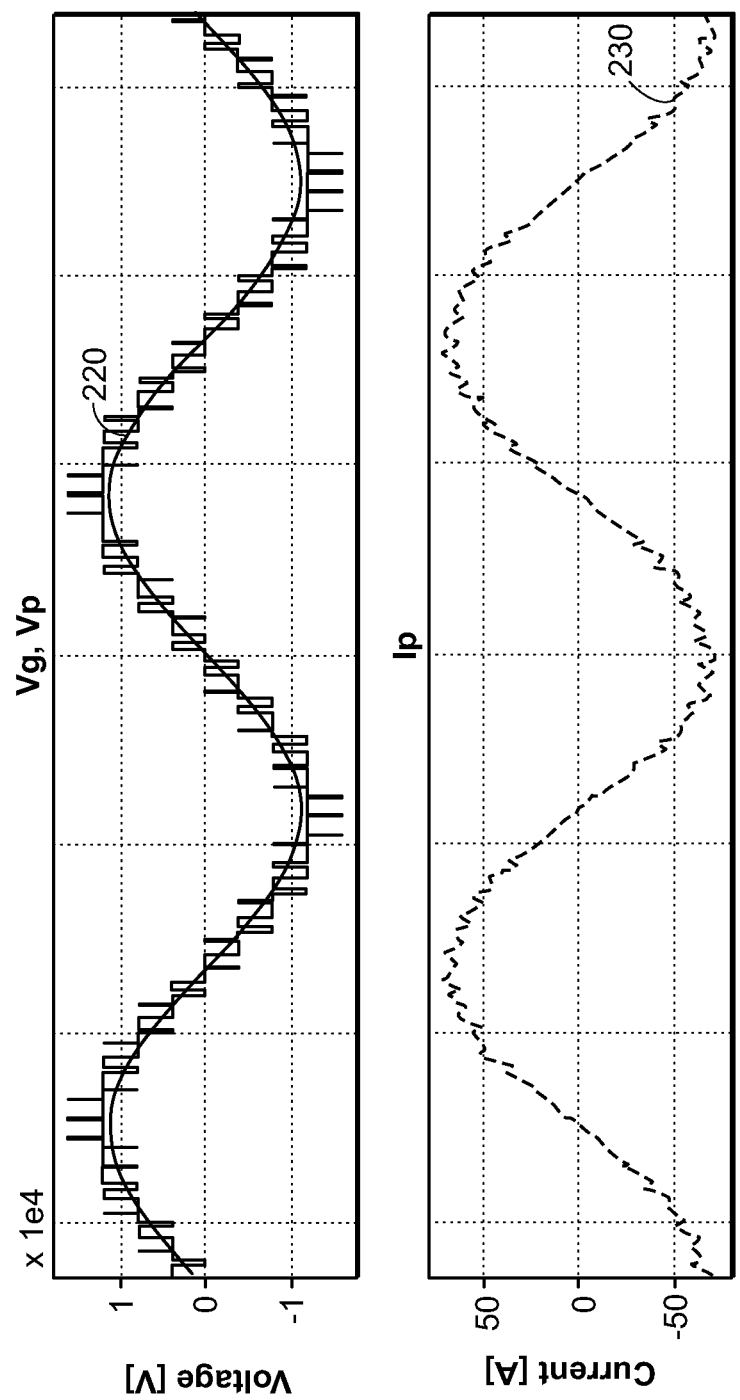
Figures 2, 10A:
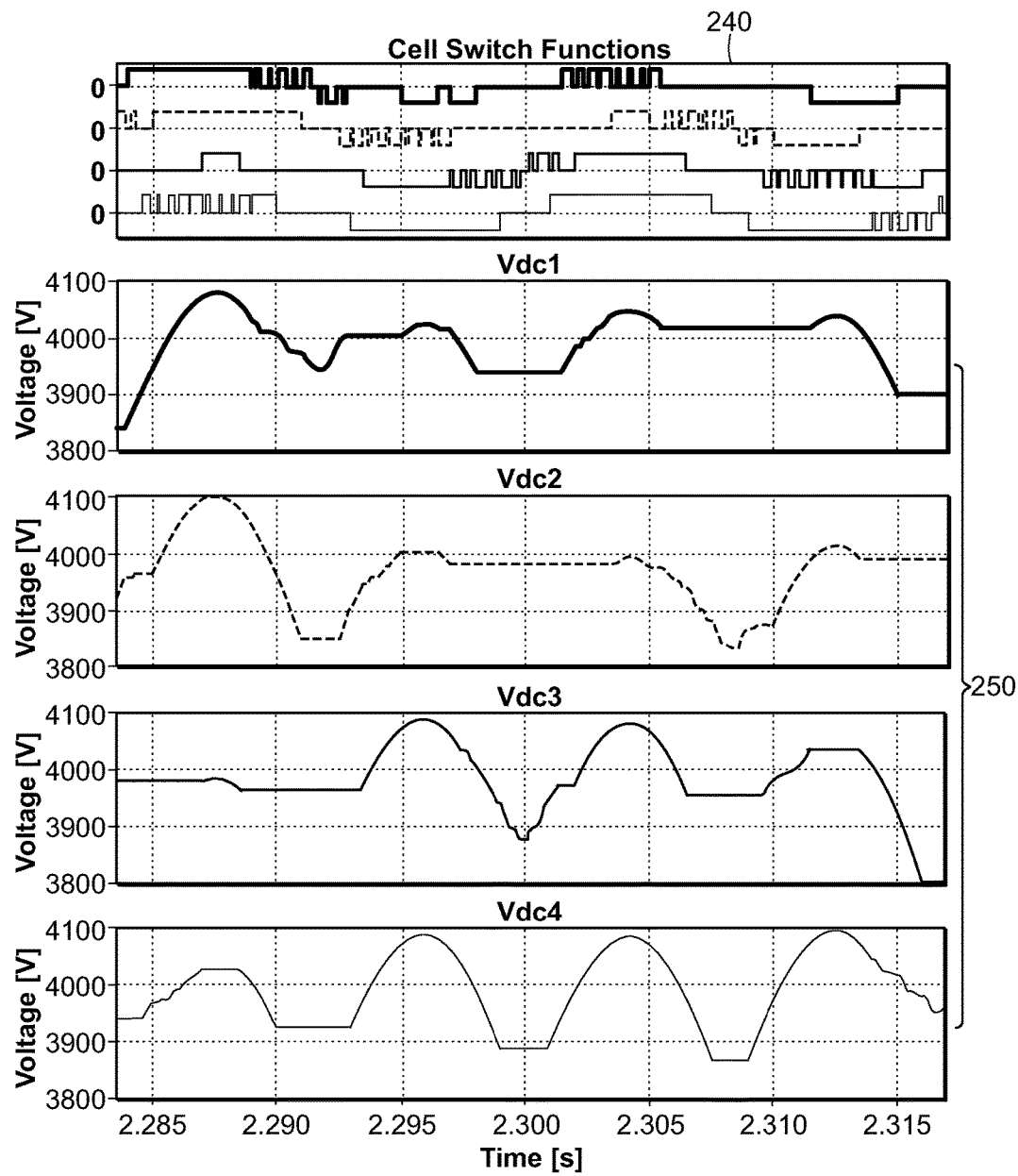

An illustration of simulation results for the above algorithm operating with a 4-cell CHB STATCOM circuit using a PWM cell is shown in FIG. 10A. Output voltage waveform 220 can be produced with the above algorithm with the CHB cells being switched in a limited manner, while maintaining balanced DC bus voltages across the 4 cells. The CHB inverter ac voltage waveform 220 has low harmonic content. This is evident by the small ripple current in the output pole current (waveform 230) using a relatively small inductor value. The cell switch waveforms 240 show the low number of switching events in each cell per fundamental period and the alternating of PWM among the 4 cells, producing balanced losses across cells. The DC bus voltages are depicted by waveforms 250. CHB inverter losses are much smaller than can be achieved with similar ac and dc bus properties with the conventional switching strategies.

Figures 1, 10B:
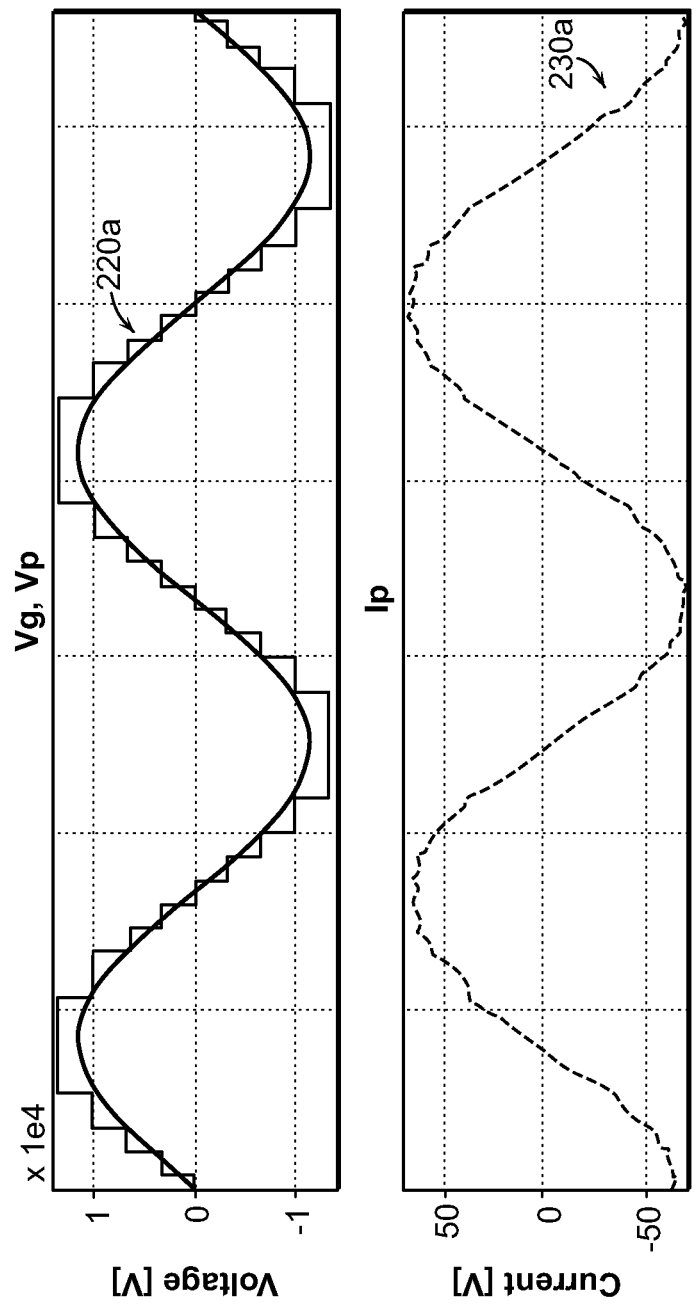
Figures 2, 10B:
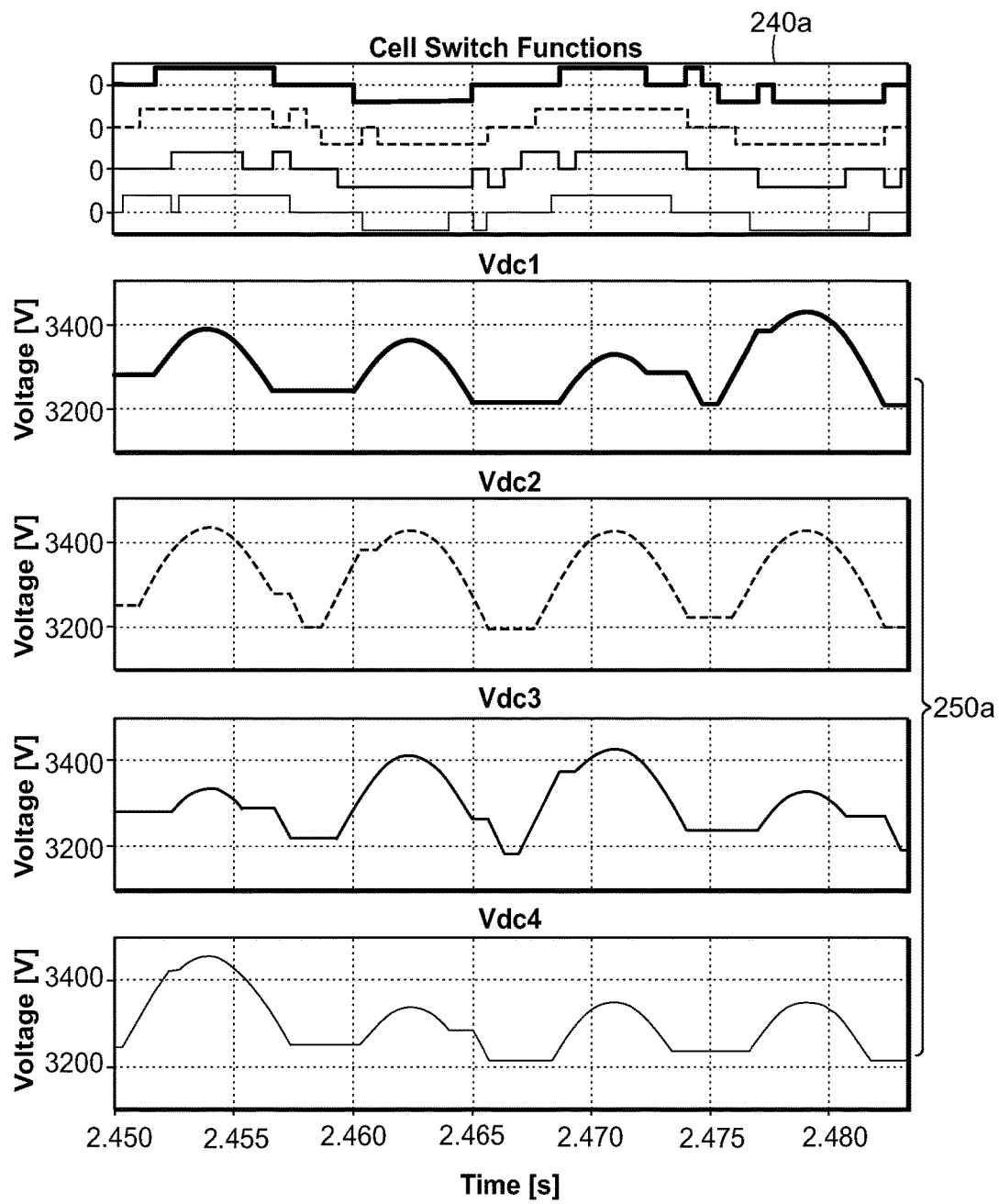

It should be noted that where there are a sufficient number of CHB levels to achieve the requisite AC harmonic waveform quality, use of the "PWM cell" may be eliminated. An illustration of simulation results for the above algorithm operating with a 4-cell CHB STATCOM circuit without using a PWM cell is shown in FIG. 10B. Output waveform 220a, output pole current 230a, cell switch waveforms 240a, and DC bus voltages 250a are depicted.

Figure 11B:
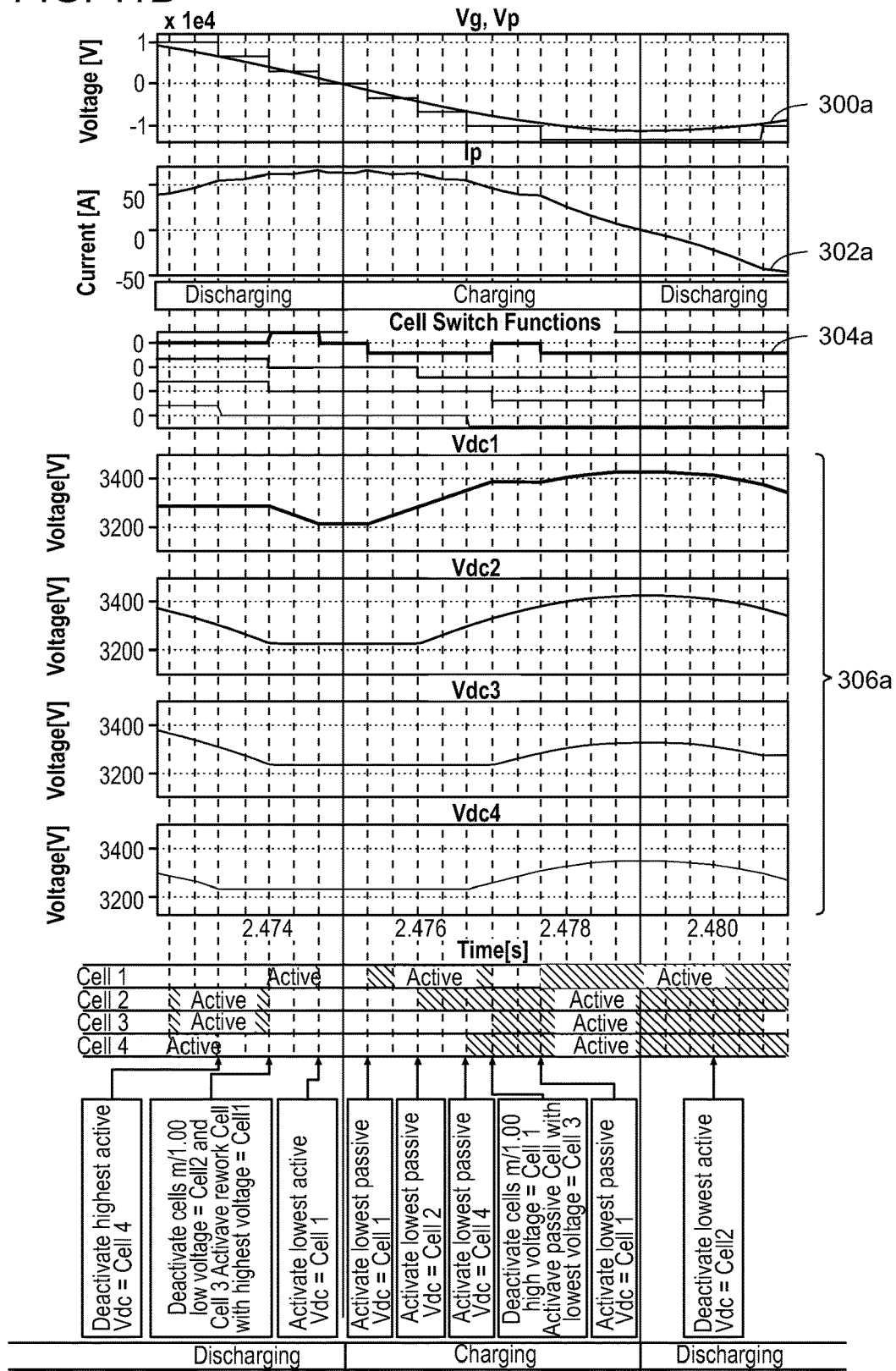
FIG. 11B depicts the output voltage waveform, output current waveform, the cell switch functions, and DC voltages across each cell of the four cell H-bridge according to this invention without using a PWM cell.

In order to more specifically illustrate the operation of the control algorithm described above with respect to FIGS. 8A,B, switching of the individual cells, the output voltage and current waveforms, as well as the DC voltages on the individual cells are depicted in FIGS. 11A (with PWM cell) and 11b (without PWM cell). As compared to FIGS. 10A and 10B, the time scale is compressed so that the cell switching operation can be observed control period by control period In FIG. 11A, output voltage waveform 300, output current waveform 302, the cell switch functions 304, and DC voltages 306 across each cell of the four cell H-bridge are depicted. In the first five control periods 310, the output waveform 300 is in the converter pole discharging region. In the first control period 312, cell 1 is inactive, cells 3 and 4 are active and cell 2 is operating as the PWM cell. As the controller transitions to the second control period 314, it determines that the commanded voltage needs to be reduced as a result of an external control loop for current regulation. For reactive current applications the average commanded inverter voltage 300 is approximately in phase with the grid voltage. As the grid voltage further decreases in magnitude at the third control period 316, an additional cell must be transitioned to the inactive state to join cell 1. Since the highest active voltage, Vdc, is on cell 3, it is switched to the inactive state. Cell 4 remains active and cell 2 continues to be the PWM cell.

As the controller transitions to the fourth control period 318, it determines that the commanded voltage needs to be further reduced. Therefore, an additional cell must be transitioned to the inactive state to join cell 1. Since cell 4 is the only remaining cell it has the highest active voltage, Vdc, in an active state other than the PWM cell, cell 2, it is transitioned to the inactive state along with cells 1 and 3 and cell 2 continues to be the PWM cell. This process continues according to the algorithm described above with respect to FIGS. 8A,B. Of note is the transition of the PWM cell between control period 7 and 8, where cell 3 becomes the PMW cell and cell 2 becomes inactive In FIG. 11B, output voltage waveform 300a, output current waveform 302a, the cell switch functions 304a, and DC voltages across each cell of the four cell H-bridge are depicted 306a. In this case there is no PWM cell. The switching of the various cells according to the above described algorithm is depicted as the as the voltage waveform progresses.

It should be noted that the only CHB topology that has been described herein is a three phase "WYE" connected CHB STATCOM, where the "negative" terminals of each of the CHB legs are connected together at a virtual neutral point (a WYE point floating topology). However, the invention is equally applicable to alternate three-phase connections, including three phase WYE connected CHB STATCOMs, where the WYE point is tied to ground, and "DELTA" connected CHB STATCOMs, where the CHB legs are connected Line-to-Line (e.g one side of the first CHB phase is connected to grid phase "A" and the other side to grid phase "B", the second CHB phase is connected to grid phases B and C, and the third CHB phase is connected to grid phases C and A). Applicable single phase topologies include phase to ground and phase to phase connected topologies.

It should be further noted that in typical 3 phase converters it is common to implement space vector modulation (SVM), e.g. as a last step in the controls, the set of 3 commanded line-neutral voltages are augmented so as to extract more usable AC voltage from the converter for the DC bus voltage. This allows one to run the DC buses at a lower voltage for the same AC voltage. Space vector modulation may similarly be implemented in the CHB STATCOM according to this invention. Further, this approach may be extended to discontinuous modulation, wherein for the three phase floating WYE topology, only two of the three converter poles would utilize a "PWM cell" at a given time and the third converter pole would not have a PWM cell. The commanded line to line voltages would be maintained by adjusting accordingly the commanded voltages to the two converter poles that use PWM cell. The phase which has no PWM cell would be rotated periodically amongst the three converter poles to spread out the loss benefit.

It should be further noted that those skilled in the art will recognize that this invention could be used with H-bridge converter cells comprised of other types of power electronics switches including, but not limited to, MOSFETs, Insulated Gate Commutated Thyristors (IGCTs), Gate Turn Off Thyristors (GTOs) etc. Additionally those skilled in the art will recognize that this switching strategy may be applied to other multilevel power converters in which there are alternating regions of charging or discharging, such as series compensators, voltage compensators, shunt active filters.

What is claimed is:
1. A static synchronous compensator, comprising:
At least one converter pole for producing a first phase of an AC voltage waveform having a fundamental cycle, the first phase of the AC voltage waveform including alternating converter pole charging regions and converter pole discharging regions in each fundamental cycle; said at least one converter pole including a plurality of cascaded H-bridge cells, each of said plurality of cascaded H-bridge cells having a DC voltage source and a plurality of switches; wherein the plurality of switches of each H-bridge cell are capable of being switched to produce a plurality of switching states; and
A controller configured to control the switching states of the plurality of switches of each of the cascaded H-bridge cells each control period of the fundamental cycle to produce a commanded converter voltage, each control period being a fraction of the fundamental cycle, based on the voltages of DC voltage sources of the H-bridge cells and on whether the AC waveform is in the converter pole charging region or the converter pole discharging region; wherein the controller is configured to receive each current control period the voltage of the DC voltage sources of each H-bridge cell and a list of the H-bridge cells which were in the active state in the control period just prior to the current control period;
wherein if the AC voltage waveform is in the converter pole charging region the controller is configured in the current control period to determine from the list of the H-bridge cells which were in an active state in the control period just prior to the current control period if the voltage of any of the DC voltage sources of the H-bridge cells in the active state exceeds a threshold voltage level and if the threshold voltage level is exceeded transition such H-bridge cell to a passive state, and for the remaining H-bridge cells maintain for the current control period the switching state of the control period just prior to the current control period; and
wherein if the AC waveform is in the converter pole discharging region the controller is configured in the current control period to determine from the list of the H-bridge cells which were in the active state in the control period just prior to the current control period if the voltage of any of the DC voltage sources of the H-bridge cells in the active state is less than a threshold voltage level and if the voltage level is less than the threshold voltage level transition such H-bridge cell to the passive state, and for the remaining H-bridge cells maintain for the current control period the switching state of the control period just prior to the current control period.

2. The static synchronous compensator of claim 1 wherein the active switching states may be either positive active switching states or negative active switching states.

3. The static synchronous compensator of claim 2 wherein the controller is configured to receive each current control period the commanded converter voltage and a current of the at least one converter pole and to determine there from whether the first phase of the AC voltage waveform is in the converter pole charging region or the converter pole discharging region in the current control period of the fundamental cycle.

4. The static synchronous compensator of claim 1 wherein if the AC voltage waveform is in the converter pole charging region the controller is configured in the current control period to:
Determine if the sum of the voltages of the H-bridge cells in the active state is less than the magnitude of the commanded converter voltage and if it is then transition the H-bridge cells from the passive state to the active state in order from lowest voltage level to highest voltage level until the sum of the voltages of the H-bridge cells in the active state is not less than the magnitude of the commanded converter voltage;
If the sum of the voltages of the H-bridge cells in the active state is determined to be not less than the magnitude of the commanded converter voltage, determine if the sum of the voltages of the H-bridge cells in the active state is more than the magnitude of the commanded converter voltage and if it is then transition the H-bridge cells from the active state to the passive state in order from highest voltage level to lowest voltage level until the sum of the voltages of the H-bridge cells in the active state is not more than magnitude of the commanded converter voltage; and
Generate a list of active H-bridge cells for the current control period.

5. The static synchronous compensator of claim 4 wherein if the AC waveform is in the converter pole discharging region the controller is configured in the current control period to:
Determine if the sum of the voltages of the H-bridge cells in the active state is less than the magnitude of the commanded converter voltage and if it is then transition the H-bridge cells from the passive state to the active state in order from highest voltage level to lowest voltage level until the sum of the voltages of the H-bridge cells in the active state is not less than the magnitude of the commanded converter voltage;
If the sum of the voltages of the H-bridge cells in the active state is determined to be not less than the magnitude of the commanded converter voltage, determine if the sum of the voltages of the H-bridge cells in the active state is more than the magnitude of the commanded converter voltage and if it is then transition the H-bridge cells from the active state to the passive state in order from lowest voltage level to highest voltage level until the sum of the voltages of the H-bridge cells in the active state is not more than the magnitude of the commanded converter voltage; and
Generate the list of active H-bridge cells for the current control period.

6. The static synchronous compensator of claim 5 wherein the controller is configured to control the switching states of the plurality of switches according to the list of active H-bridge cells generated for the current control period.

7. The static synchronous compensator of claim 6 wherein the controller is further configured to modulate, during the control period, one of the H-bridge cells using pulse width modulation (PWM), the modulated cell being the PWM cell.

8. The static synchronous compensator of claim 7 wherein the controller is configured to select the PWM cell based on a count of fundamental cycles of the AC voltage waveform which have been produced and on a segment of the fundamental cycle during which the PWM cell was last modulated.

9. The static synchronous compensator of claim 7 wherein the controller is configured to compare the magnitude of the commanded converter voltage to the sum the voltages of the list of active H-bridge cells generated for the current control period and modulate the PWM cell with a duty cycle to produce a PWM cell voltage substantially equal to the voltage difference between the magnitude of the commanded converter voltage and the sum the voltages of the list of active H-bridge cells generated for the current control period.

10. The static synchronous compensator of claim 7 wherein determining if the sum of the voltages of the H-bridge cells in the active state is less than the magnitude of the commanded converter voltage includes adding a cell voltage of the PWM cell.

11. The static synchronous compensator of claim 1 wherein the plurality of cascaded H-bridge cells comprises any integer number of H-bridge cells.

12. The static synchronous compensator of claim 1, further comprising:
a second converter pole for producing a second phase of an AC voltage waveform having a fundamental cycle, the second phase of the AC voltage waveform including alternating converter pole charging regions and converter pole discharging regions in each fundamental cycle; said second converter pole including a plurality of cascaded H-bridge cells, each of said plurality of cascaded H-bridge cells having a DC voltage source and a plurality of switches; wherein the plurality of switches of each H-bridge cell are capable of being switched to produce a plurality of switching states;
the controller configured to control the switching states of the plurality of switches of each of the cascaded H-bridge cells based on the voltages of DC voltage sources of the H-bridge cells and on whether the second phase of the AC waveform is in the converter pole charging region or the converter pole discharging region;
a third converter pole for producing a third phase of an AC voltage waveform having a fundamental cycle, the third phase of the AC voltage waveform including alternating converter pole charging regions and converter pole discharging regions in each fundamental cycle; said third converter pole including a plurality of cascaded H-bridge cells, each of said plurality of cascaded H-bridge cells having a DC voltage source and a plurality of switches; wherein the plurality of switches of each H-bridge cell are capable of being switched to produce a plurality of switching states; and
the controller configured to control the switching states of the plurality of switches of each of the cascaded H-bridge cells based on the voltages of DC voltage sources of the H-bridge cells and on whether the third phase of the AC waveform is in the converter pole charging region or the converter pole discharging region.

13. The static synchronous compensator of claim 12 wherein the controller is further configured to modulate, during the control period, one of the H-bridge cells in each of the first, second, and third converter poles using pulse width modulation (PWM), the modulated cells being the PWM cells.

14. The static synchronous compensator of claim 12 wherein the controller is further configured to modulate, during the control period, one of the H-bridge cells in two converter poles of the first, second and third converter poles using pulse width modulation (PWM), the modulated cells being the PWM cells; and wherein the two converter poles of the first, second and third converter poles having PWM cells are changed periodically.

15. The static synchronous compensator of claim 12 wherein the first, second and third converter poles are connected in a WYE point floating topology.

16. A static synchronous compensator, comprising:

At least one converter pole for producing a first phase of an AC voltage waveform having a fundamental cycle, the first phase of the AC voltage waveform including alternating converter pole charging regions and converter pole discharging regions in each fundamental cycle; said at least one converter pole including a plurality of cascaded H-bridge cells, each of said plurality of cascaded H-bridge cells having a DC voltage source and a plurality of switches; wherein the plurality of switches of each H-bridge cell are capable of being switched to produce a plurality of switching states; and A controller configured to control the switching states of the plurality of switches of each of the cascaded H-bridge cells every control period of the fundamental cycle to produce a commanded converter voltage, wherein each control period is a fraction of the fundamental cycle; the controller being configured to maintain for the current control period the switching state of each of the cascaded H-bridge cells of the control period just prior to the current control period unless a predetermined condition is determined based on the voltages of the DC voltage sources of the H-bridge cells and on whether the AC waveform is in the converter pole charging region or the converter pole discharging region.

17. The static synchronous compensator of claim 16 wherein the plurality of cascaded H-bridge cells comprises any integer number of H-bridge cells.

* * * * *